(12) United States Patent
Douglas-Hamilton et al.

(10) Patent No.: US 11,828,925 B2
(45) Date of Patent: Nov. 28, 2023

(54) MODULAR OBJECTIVE ASSEMBLY WITH MOVEABLE LASER BEAM

(71) Applicant: Hamilton Thorne, Inc., Beverly, MA (US)

(72) Inventors: Diarmaid Douglas-Hamilton, Beverly, MA (US); Sudha Thimmaraju, Andover, MA (US); Stephen F. Fulghum, Jr., Fairview, NC (US); Thomas G. Kenny, Ipswich, MA (US); Thomas G. Kenny, Jr., Topsfield, MA (US)

(73) Assignee: HAMILTON THORNE, INC., Beverly, MA (US)

( * ) Notice: Subject to any disclaimer, the term of this patent is extended or adjusted under 35 U.S.C. 154(b) by 289 days.

(21) Appl. No.: 17/080,290

(22) Filed: Oct. 26, 2020

(65) Prior Publication Data

US 2021/0041680 A1 Feb. 11, 2021

Related U.S. Application Data

(63) Continuation of application No. 16/261,322, filed on Jan. 29, 2019, now Pat. No. 10,816,786.

(60) Provisional application No. 62/623,375, filed on Jan. 29, 2018.

(51) Int. Cl.
*G02B 21/04* (2006.01)
*G02B 21/00* (2006.01)
*G02B 21/06* (2006.01)
*G02B 21/36* (2006.01)

(52) U.S. Cl.
CPC ......... *G02B 21/04* (2013.01); *G02B 21/0012* (2013.01); *G02B 21/06* (2013.01); *G02B 21/36* (2013.01)

(58) Field of Classification Search
CPC .... G02B 21/04; G02B 21/0012; G02B 21/06; G02B 21/36; G02B 21/32; G02B 26/0816; G02B 27/34; A61B 18/18; A61B 18/20
USPC ........................................................ 359/385
See application file for complete search history.

(56) References Cited

U.S. PATENT DOCUMENTS

| | | | |
|---|---|---|---|
| 3,796,220 A | 3/1974 | Bredemeier | |
| 5,159,225 A * | 10/1992 | Um ........................ | H02N 2/10 310/333 |
| 6,853,448 B2 * | 2/2005 | Lenz .................. | G01N 21/8806 356/237.1 |
| 7,019,877 B2 * | 3/2006 | Shpizel .............. | G02B 26/0833 359/220.1 |
| 7,388,700 B1 * | 6/2008 | Odhner ................ | G02B 7/1821 359/224.1 |
| 8,284,484 B2 | 10/2012 | Hoult et al. | |
| 9,632,327 B2 * | 4/2017 | Chan ........................ | G03B 5/00 |

(Continued)

OTHER PUBLICATIONS

International Search Report and Written Opinion dated Apr. 18, 2019 in International Application No. PCT/US2019/015700.

*Primary Examiner* — Balram T Parbadia
*Assistant Examiner* — Rahman Abdur
(74) *Attorney, Agent, or Firm* — Brown Rudnick LLP; Ian G. DiBernardo

(57) ABSTRACT

The present invention provides, in various embodiments, a miniature movable-beam laser objective configured to fit within the very small dimensions of a standard objective. This small, portable movable-laser source allows the beam to be directed at a computer-generated target or at the spot of a focused target-designator beam.

17 Claims, 25 Drawing Sheets

(56) References Cited

U.S. PATENT DOCUMENTS

| | | | |
|---|---|---|---|
| 2004/0190097 A1 | 9/2004 | Shpizel et al. | |
| 2007/0176597 A1* | 8/2007 | Yamada | G01D 5/145 |
| | | | 324/207.24 |
| 2007/0291798 A1 | 12/2007 | Kenny et al. | |
| 2009/0252186 A1* | 10/2009 | Pan | H04N 9/3129 |
| | | | 372/26 |
| 2009/0316259 A1* | 12/2009 | Kenny | G02B 21/04 |
| | | | 359/385 |
| 2010/0049055 A1 | 2/2010 | Freudenberg et al. | |
| 2010/0118395 A1* | 5/2010 | Douglas-Hamilton | |
| | | | G02B 21/082 |
| | | | 359/385 |
| 2011/0255155 A1* | 10/2011 | Hebrink | B32B 27/32 |
| | | | 359/359 |

* cited by examiner

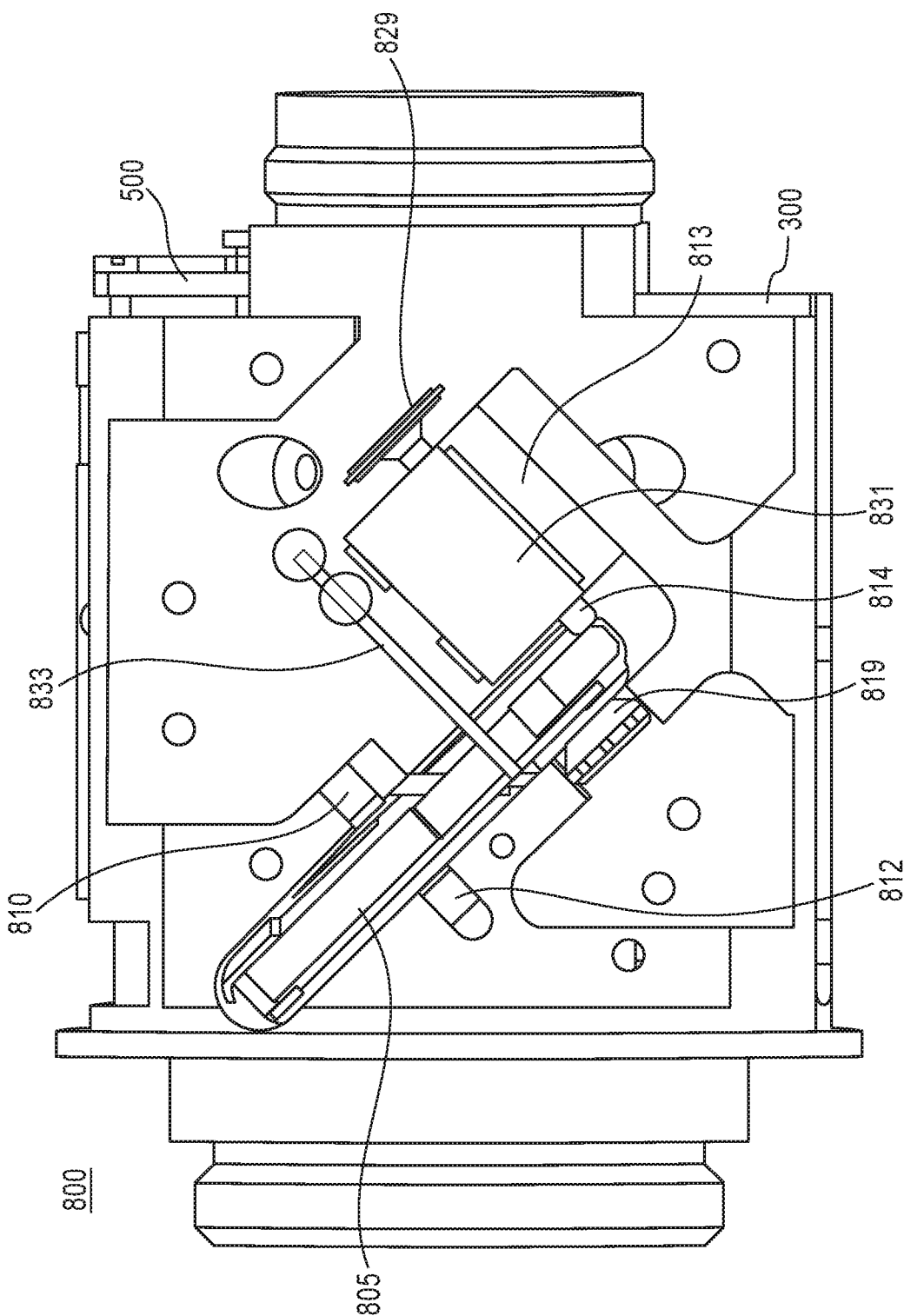

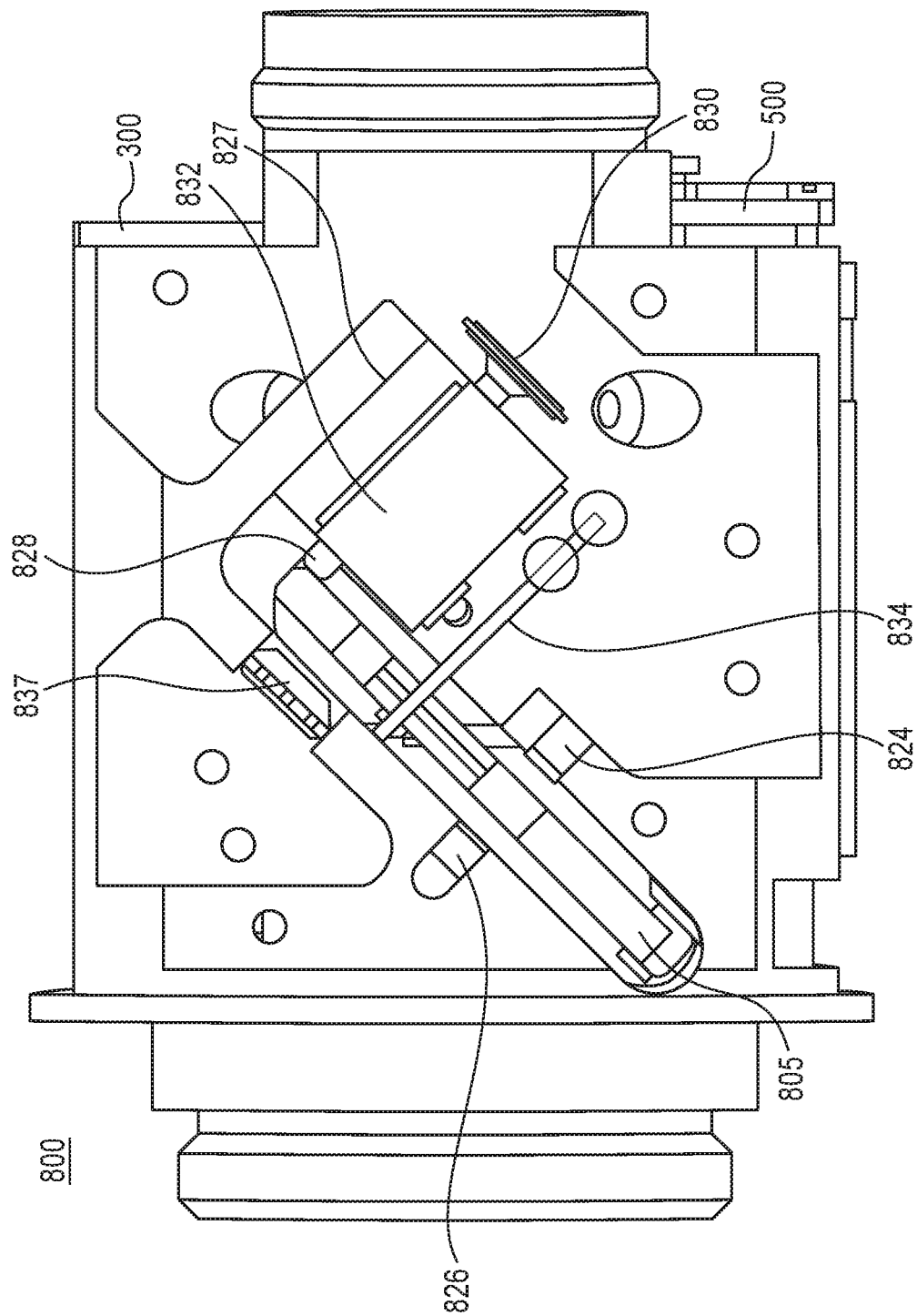

MODULAR OBJECTIVE ASSEMBLY WITH MOVEABLE LASER BEAM

CROSS-REFERENCE TO RELATED APPLICATIONS

This application is a continuation of U.S. application Ser. No. 16/261,322, filed Jan. 29, 2019 and issued Oct. 27, 2020 as U.S. Pat. No. 10,816,786, which claims the benefit of U.S. Provisional Application No. 62/623,375, filed Jan. 29, 2018, each of which is incorporated by reference herein in its entirety.

BACKGROUND

Infrared lasers have become the method of choice for certain operations in assisted reproduction technology (ART). The availability of small infrared lasers tuned to the absorption bands of water have enabled operation on embryos and sperm by non-contact, Class I infrared beams. The practice of ART has indicated that near-infrared (e.g., wavelength of 1450 to 1480 nm) lasers are invaluable in the field. They can be used, for example, for zona pellucida drilling and ablation (severing the connections between and manipulating biopsy and embryo) and for polar body extraction, applications to which they have been applied in most countries. They can also be used for embryonic enucleation and for assisting with nuclear transfer.

SUMMARY

Various embodiments of the invention provide a laser objective assembly for use with a microscope that can provide a moveable dichroic mirror and, thus, a moveable laser beam. In some embodiments, an indicator beam may also be provided within the same device. When the mirror moves, the indicator beam will remain opposed to the laser beam, providing the essential information on the latter's position. When viewed through the camera system of the microscope, the indicator beam is superimposed on the microscope image and indicative of the position of the laser when fired.

In some embodiments, the invention provides a moveable-beam laser objective assembly for mounting onto a turret of a microscope having a camera, comprising: a modular objective body including an objective having an optical axis; a dichroic mirror located within the objective body and positioned at an angle relative to the optical axis, the mirror configured to direct a laser beam through the objective and toward a target for performing laser microsurgery and configured to direct an indicator beam toward the camera, in a direction opposite to that of the laser beam, for providing a visible indication of the laser beam position on the target; a mirror frame on which the mirror is mounted, the mirror frame having a socket to accommodate the mirror and configured to be moveable on two axes; a restoring support configured to provide a restoring force to the mirror frame substantially perpendicular to its plane; a kinematic support configured to generate force against the mirror frame in a direction opposite to that of the restoring force, the kinematic support controllable by a computer; and at least one rod or fiber secured to the objective body, the rod or fiber constructed and arranged to constrain the mirror frame against yaw motion.

In some embodiments, the kinematic support comprises at least one linear actuator, each linear actuator comprising a rod configured to contact the mirror frame, and a piezoelectric transducer configured to move the respective rod.

In some embodiments, the kinematic support is a three-point support comprising two linear actuators and a pin configured to contact the mirror frame.

In some embodiments, the objective assembly further comprises two position-measuring magnets mounted to the mirror frame and two Hall effect sensors positioned proximal thereto.

In some embodiments, the restoring support comprises one or more magnets or one or more springs positioned between the mirror frame and the objective body.

In some embodiments, the restoring support is a magnetic support comprising at least three magnets, an upper magnet and a lower magnet, mounted in the objective body and arranged a predetermined distance apart in mutually repulsive mode; and an intermediate magnet mounted to the mirror frame, having an upper face attracted by the upper magnet, and a lower face repelled by the lower magnet, so that the space between the upper and lower magnets provides the intermediate magnet with a substantially constant restoring force.

In some embodiments, the restoring support is a magnetic support comprising six magnets.

In some embodiments, the six magnets comprise three on each side of the mirror frame, each set of three comprising an upper magnet and a lower magnet, mounted in the objective body and arranged a predetermined distance apart in mutually repulsive mode; and an intermediate magnet mounted to the mirror frame, having an upper face attracted by the upper magnet, and a lower face repelled by the lower magnet, so that the space between the upper and lower magnets provides the intermediate magnet with a substantially constant restoring force.

In some embodiments, the mirror has a first side for directing the laser beam and a second side for directing the indicator beam.

In some embodiments, a first side surface of the mirror facing the objective lens has a reflective coating thereon.

In some embodiments, the coating on the first side surface of the mirror is configured to enhance reflectivity in an infrared wavelength of the laser beam, and transmit in the visible and ultraviolet.

In some embodiments, a second side surface of the mirror facing the camera is uncoated or coated with an anti-reflector coating, and the indicator beam is transmitted therethrough and reflected by the underside of the coating on the first side surface of the mirror.

In some embodiments, the coating on the first side surface of the mirror is configured to preferentially simultaneously reflect both the laser beam wavelength and the indicator beam wavelength.

In some embodiments, a second side surface of the mirror facing the camera includes a reflector coating or other reflection enhancing mechanism, and the indicator beam is reflected by the second side surface of the mirror.

Additional features and advantages of the present invention are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

The foregoing summary, as well as the following detailed description of the preferred embodiments of the application, will be better understood when read in conjunction with the appended drawings. For the purposes of illustrating the systems and methods of the present application, there are shown in the drawings preferred embodiments. It should be understood, however, that the application is not limited to the precise arrangements and instrumentalities shown. In the drawings:

FIG. 9A is a left-hand side view of a moveable-beam laser objective assembly according to some embodiments of the invention, shown without the housing;

FIG. 9C shows the moveable-beam objective of FIG. 9B rotated an additional 90° to show the right-hand side;

DETAILED DESCRIPTION

Laser objective assemblies such as LYKOS® and ZILOS-tk® have been described, for example, in U.S. Pat. Nos. 8,422,128, 9,335,532, both of which are assigned to Hamilton Thorne, Inc. and incorporated by reference herein in their entirety.

The LYKOS® and ZILOS-tk® normally provide a static, pulsed, focused infrared (IR) beam, which is fixed-position in the center of the field. The target (e.g., an embryo or an embryo biopsy) is moved across the beam focus using manipulators, generally on an inverted microscope. The position of the focal spot is indicated by either a computer-generated target image superimposed on the microscope image, or by a visible targeting beam (also referred to herein as RED-i®; see, e.g., U.S. Pat. Nos. 8,149,504, 8,422,128, both of which are assigned to Hamilton Thorne, Inc. and incorporated by reference herein in their entirety). The laser is fired at selected targets in brief, energetic pulses. In order to irradiate a desired portion the user can set the laser exactly in the focal spot and fire the laser pulse. In certain applications a series of laser pulses may be used, in others a single pulse may be used. For this reason a multi-pulse capability is preferably included, and for example the extruded biopsy can be cut with a series of single or multiple pulses.

Improved laser objective assemblies, which can provide a moveable beam, are needed in the art.

Embodiments of the present invention provide a miniature movable-beam laser objective configured to fit within the very small dimensions of a standard objective. This small, portable movable-laser source allows the beam to be directed at a computer-generated target or at the spot of a focused target-designator (e.g., RED-i®) beam.

Figure 1A:
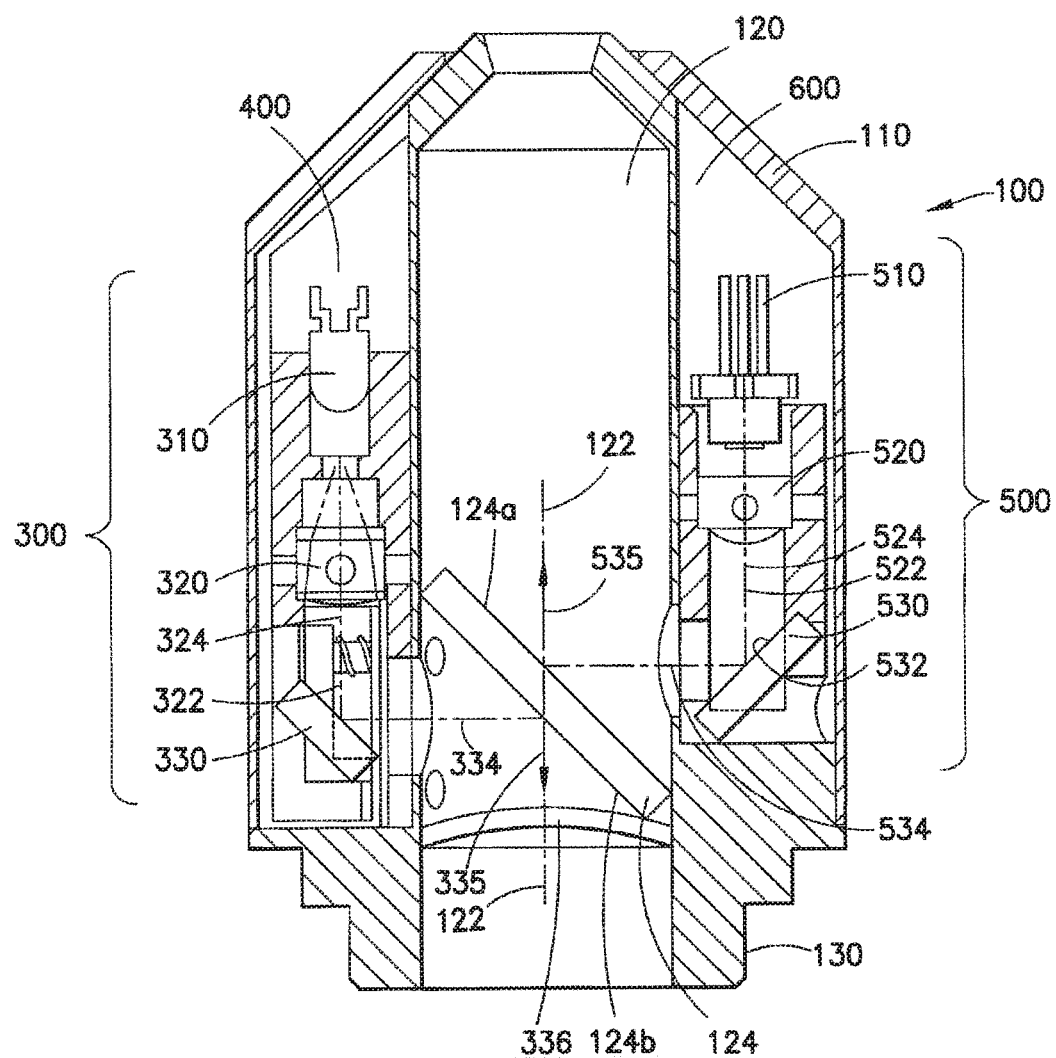
FIG. 1A is a schematic view of an illustrative modular microscope objective assembly.
Figure 1B:
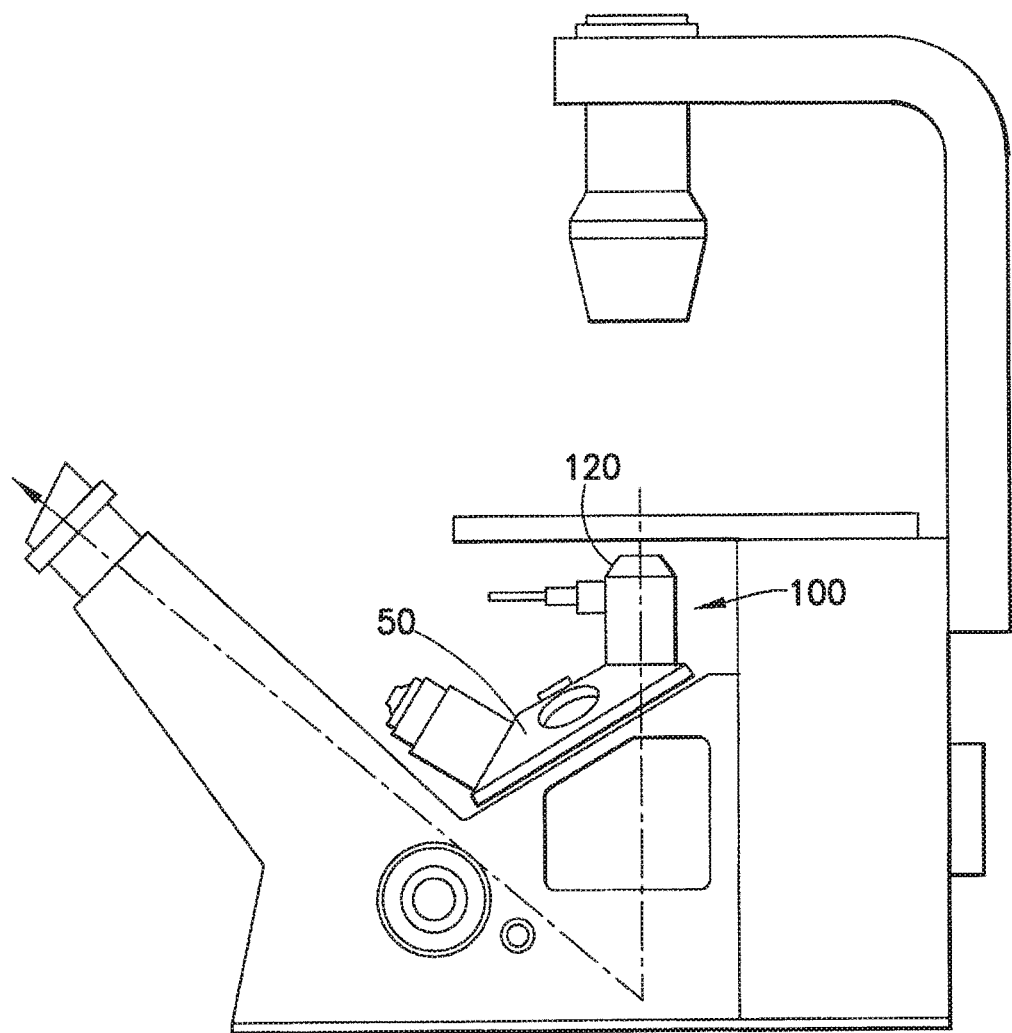
FIG. 1B is side view of the modular microscope objective of FIG. 1A mounted on a microscope turret.
Figure 2:
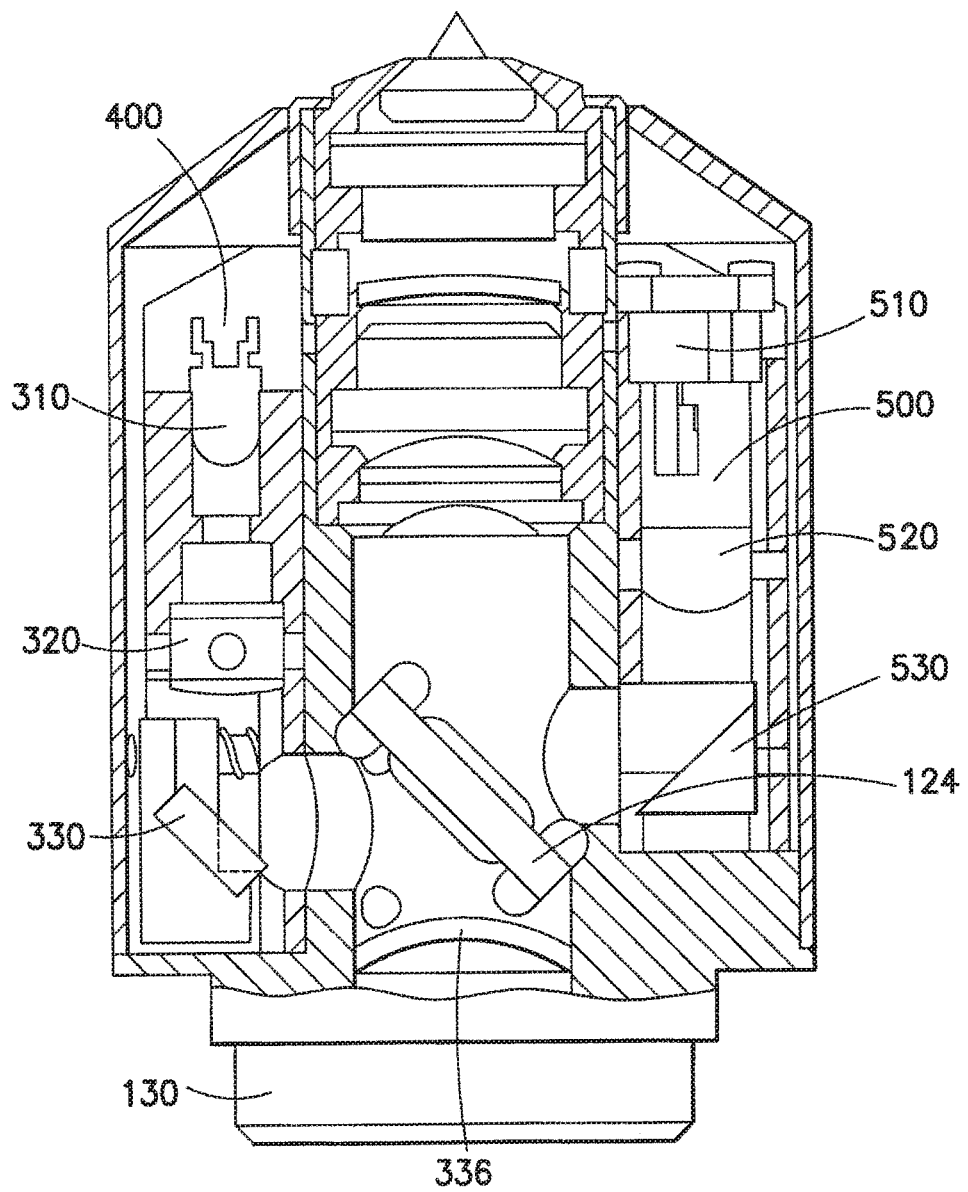
FIG. 2 is a cutaway view of the modular microscope objective of FIG. 1A.
Figure 4:
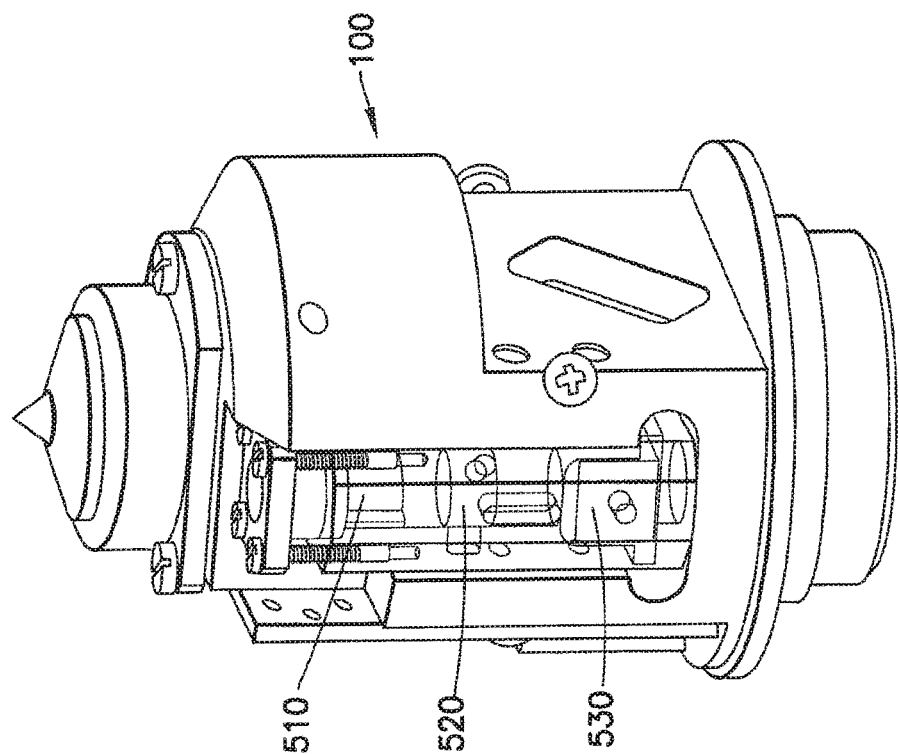
FIG. 4 is a perspective view of the modular microscope objective of FIG. 1A, shown without the housing.
Figure 3:
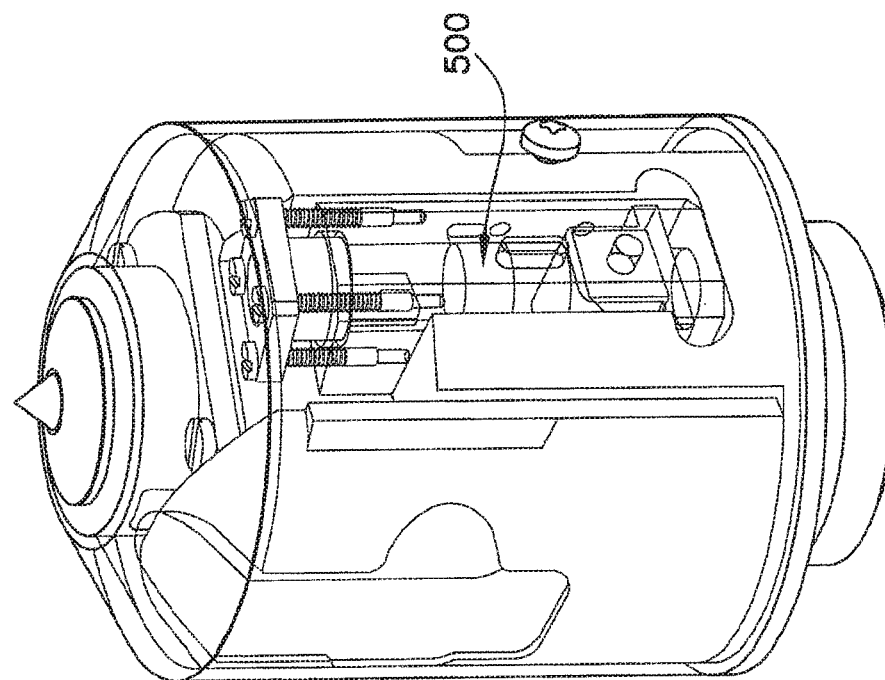
FIG. 3 is a perspective view of the modular microscope objective of FIG. 1A, the housing shown in transparency.
Figure 6:
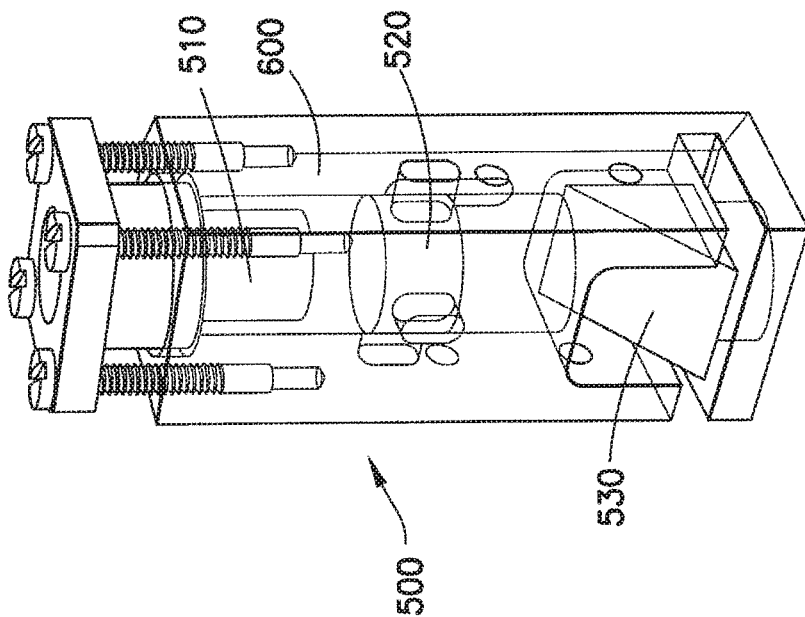
FIG. 6 is a perspective view from the opposite side of the laser module of FIG. 5.
Figure 5:
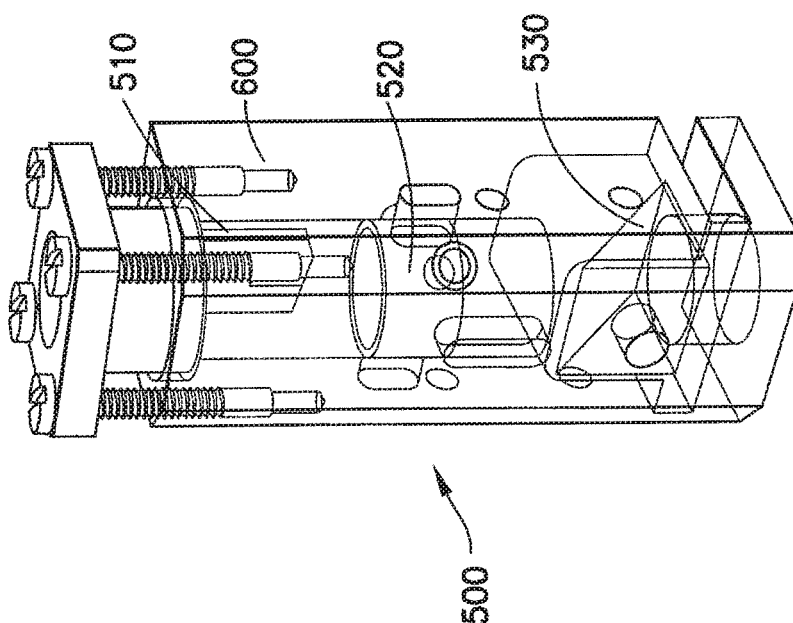
FIG. 5 is a perspective view of the laser module of FIG. 1A, the laser module housing shown in transparency.

The miniaturized mechanism for generating and moving a microscope laser beam across the field is preferably configured within a compact laser objective operating generally like the LYKOS®, as shown in FIGS. 1A-B and 2-7 and described in detail in U.S. Pat. No. 8,422,128, which is incorporated by reference herein. Referring to FIG. 1A, which is a schematic illustrating the general operation of the movable-beam laser objective, a laser assembly/module 500 in housing 600, incorporated within a microscope objective assembly 100 in housing 110, is arranged to have an epi-illuminating collimated IR laser beam 522 antiparallel to the optic axis 122. The IR laser beam 522, provided from laser source 510 through collimating lens 520 along a first path 524, is reflected by a 45° mirror 530 (with optional coating 532, e.g., an infrared reflector that can enhance the reflectivity of infrared laser beam 522 off mirror 530) along a second path 534 on to a first side surface 124a of a 45° dichroic mirror 124 mounted in a mirror frame of the present invention (mirror frame not shown in the schematic of FIG. 1A; see, e.g., FIGS. 8, 9A, 9C, 12-14), from which the beam is reflected along a third path 535 through the optical system and is focused on the target by the objective 120. It is absorbed in the target. A standard visible beam from the microscope condenser illuminates the target from the other direction and an image of the target is formed by the objective and transmitted to the camera. The laser light and the image beam therefore travel in opposite directions.

Simultaneously a collimated LED indicator beam 322 (wavelength typically about 633 nm, although different wavelengths, e.g. 400 to 700 nm, can be used in various applications to provide contrast with the image field), provided from indicator light source 310 through indicator collimating lens 320 along a first indicator path 324, is generated antiparallel to the laser beam path 535, and is reflected by an adjustable mirror 330 along a second indicator path 334 on to a second (camera-facing) side surface 124b of the dichroic mirror 124 in the mirror frame (mirror frame not shown in the schematic of FIG. 1A; see, e.g., FIGS. 8, 9A, 9C, 12-14), and is reflected at about 90° into a direction opposite to the laser beam path 535. The LED light provides an indicator of laser location on the target, and travels along a third indicator path 335, through a lens 336 and a turret mount 130 on turret 50, to the camera. At the same time, the target image is provided by the microscope system: the red dot from the LED indicator appears superimposed on it, and indicates position of the laser on the target.

In some embodiments, reflection of the light from indicator source 310 and/or the light from laser source 510 off the dichroic mirror 124 may be enhanced by a coating on one or both surfaces thereof. For example, first side surface 124a can be coated with a layer designed to enhance the reflectivity in the infrared wavelength of the incident laser beam, and transmit in the visible and ultraviolet. Second side surface 124b can include a reflector coating or other reflection enhancing mechanism. Alternatively, second side surface 124b can be left uncoated or coated with an anti-reflector coating, so that reflection of the indicator beam therefrom is minimized, in which case first side surface 124a can be used to reflect in opposite directions both the laser beam and the indicator beam. In this alternative embodiment, the indicator beam on path 334 proceeds through the camera-facing surface 124b of the dichroic mirror, is reflected internally by the coating on surface 124a of the dichroic mirror (which faces the objective lens), and is transmitted by surface 124b in a direction exactly antiparallel to laser beam path 535. The coating on side 124a can be designed to preferentially simultaneously reflect both the laser source wavelength and the indicator source wavelength.

Since the LED indicator light from indicator assembly/module 300 in housing 400 is reflected off either side 124a or side 124b of the dichroic mirror as described above, in both cases the indicator beam 322 leaving the dichroic mirror 124 along path 335 will be antiparallel to the laser beam path 535 reflected from surface 124a. Therefore, the adjustable mirror 330 may be set to make the indicator beam along path 335 coincidental with the image of the target in the camera/eyepiece. The LED image remains coincidental with and appears superimposed on the laser target despite motion of the dichroic mirror 124, said motion provided by the present invention as described in detail below.

Figure 7:
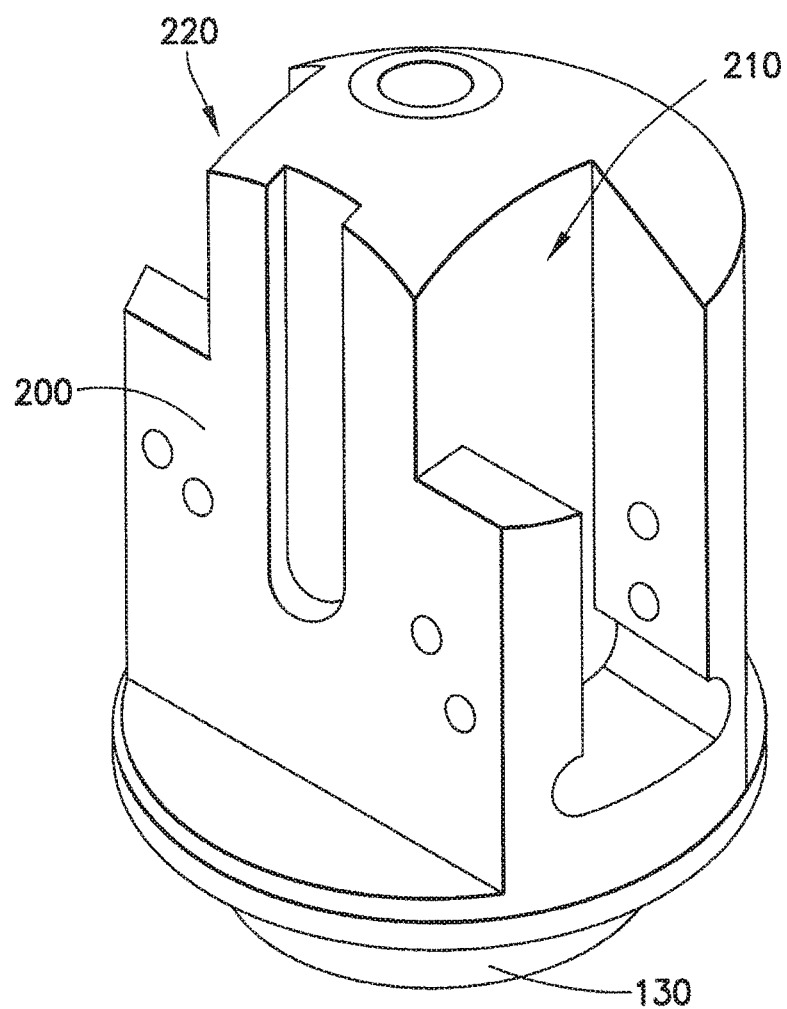
FIG. 7 is a perspective view of the mounting modular body of FIG. 1A with slots for receiving the laser module and the indicator module.
Figure 8:
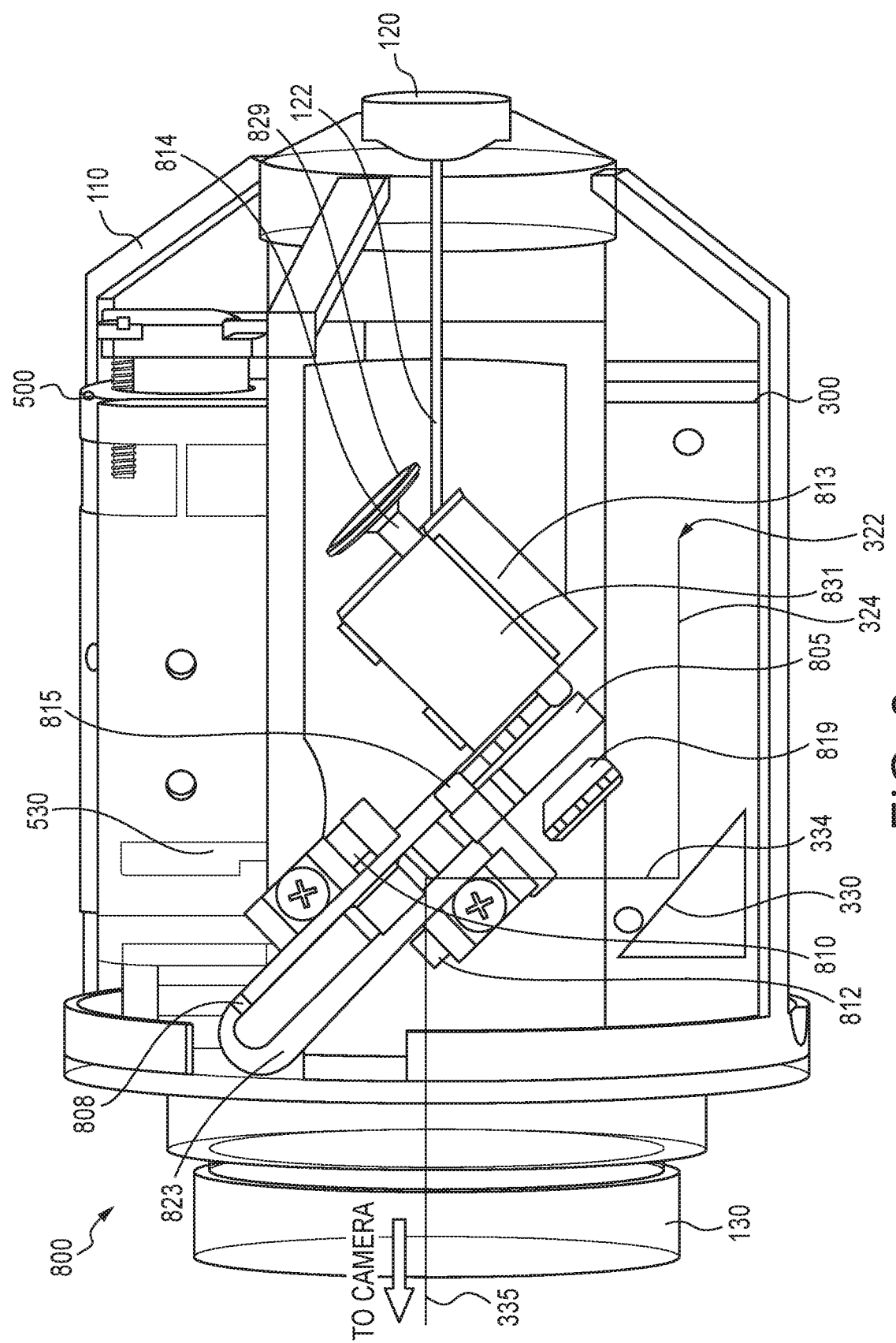
FIG. 8 is a schematic left-hand side view of a moveable-beam laser objective assembly according to some embodiments of the invention, the housing shown in transparency.
Figure 9B:
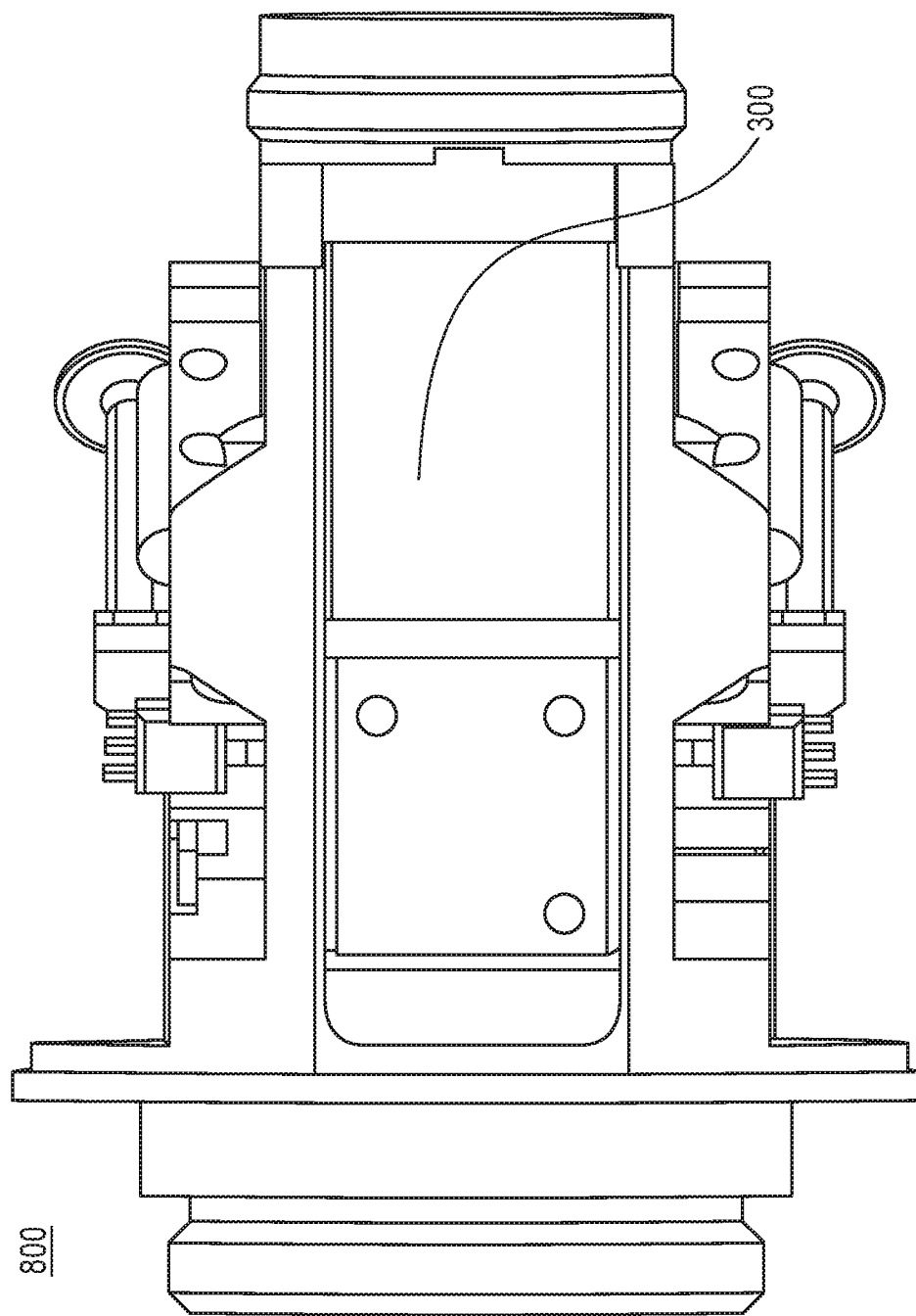
FIG. 9B shows the moveable-beam objective of FIG. 9A rotated 90° into the plane around the optic axis to show the indicator module.
Figure 9D:
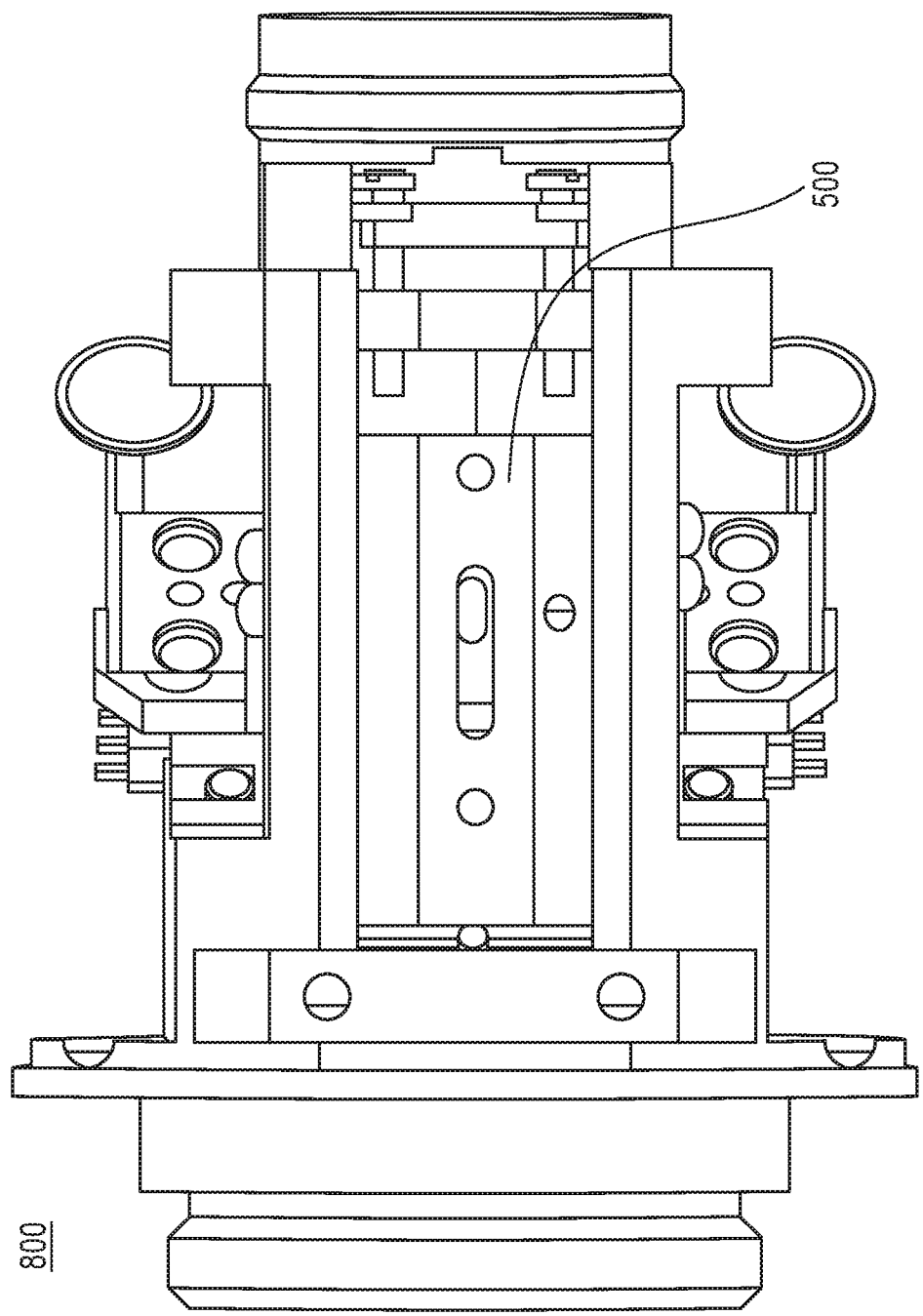
FIG. 9D shows the moveable-beam objective of FIG. 9C rotated an additional 90° to show the laser module.
Figure 10:
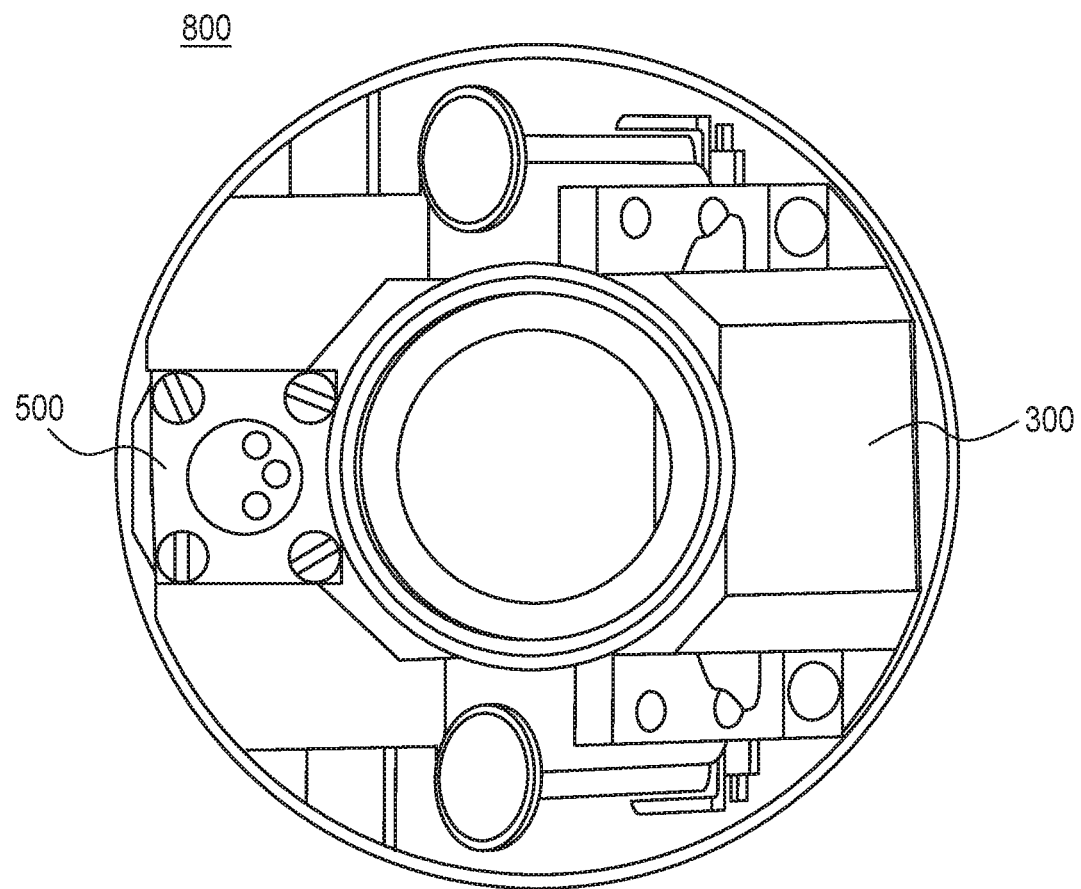
FIG. 10 is a top (objective end) view of the moveable-beam objective of FIGS. 9A-9D.
Figure 11:
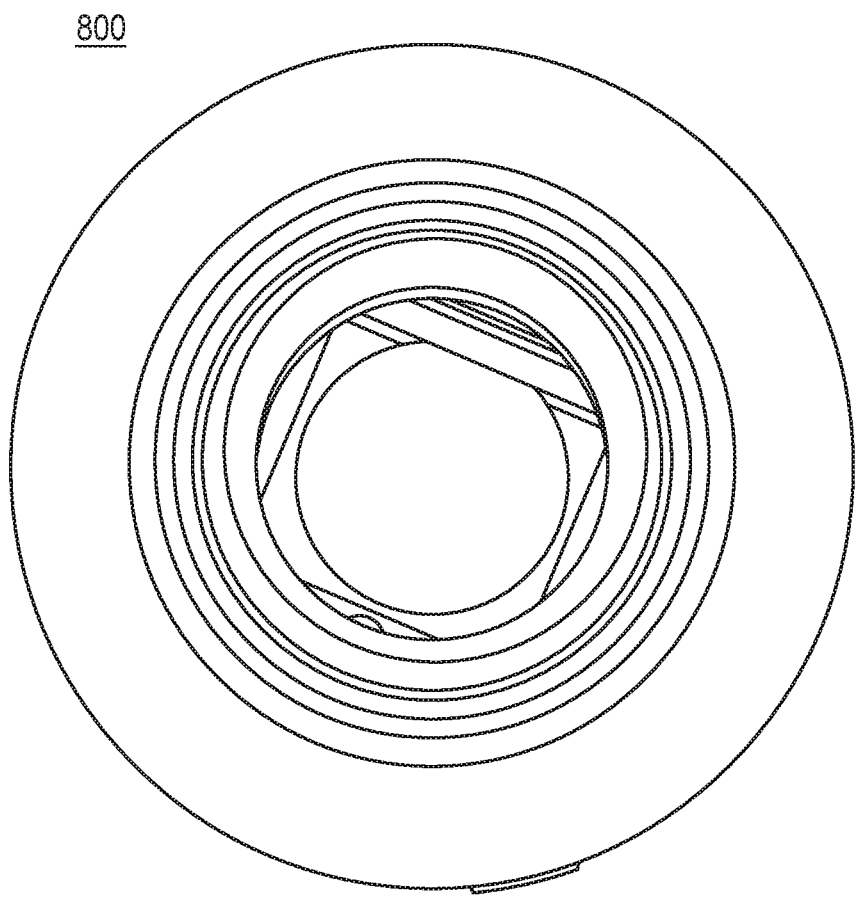
FIG. 11 is a bottom (camera-facing end) view of the moveable-beam objective of FIGS. 9A-9D.

The modular body 200, shown generally in FIG. 7 with slots 210, 220 for receiving laser module 500 and indicator module 300, respectively, is preferably adapted in the present invention to have a slot 823 cut at 45° to the optic axis 122 (see FIG. 8), into which the movable dichroic mirror 124 is fitted, supported on its mirror frame 805 as described in detail below.

With reference to FIGS. 8, 9A-D, and 10-14, in some embodiments, the laser can steered by the internal system of the movable-beam laser objective 800 as follows.

The laser beam is reflected about 90° off the dichroic mirror 124, toward the target. The dichroic mirror 124 is mounted on the mirror frame 805 so that it can be moved in two axes, and the laser beam along path 535 can be directed at any point on the target.

The dichroic mirror frame 805 is impelled by a restoring force, for example, up against a pin 808 normal to the mirror surface. In some embodiments, the pin 808 is a static vertex pin, which may form one point of a three-point support of the mirror frame 805 (the other two supports provided by tips of actuator rods 814, 828 as described below). A cup 809 may be provided on the mirror frame 805 into which the pin 808 is configured to fit. In some embodiments, cup 809 may comprise a machined, sapphire cone pivot hole at the apex of the mirror frame 805.

The restoring force can be provided, for example, by springs, one or more magnets, or other restoring means, for example, attached between the mirror frame 805 and the objective body. In some embodiments, the restoring force is provided by six right cylinder magnets (e.g., 1.5 mm diameter, 1.5 mm height), three on each side of the mirror frame 805, arranged as described below.

The first magnet 810 is mounted in the objective body, and attracts the second magnet 811, which is mounted at the periphery of the mirror frame 805, thus forcing mirror frame 805 upwards.

The upper face of the second magnet 811, mounted in the mirror frame 805, is attracted to the lower face of the first magnet 810.

The third magnet 812 is mounted approximately coaxial with the first magnet 810 and the second magnet 811, opposite the first magnet 810 in the objective body beneath the dichroic mirror 124. The third magnet 812 is set to repel the lower face of the second magnet 811. It therefore also repels the lower face of the first magnet 810.

The magnetic forces therefore combine to float the mirror frame 805 between the first magnet 810 and the third magnet 812, forcing mirror frame 805 upwards towards the first magnet 810. The mutually repelling first magnet 810 and third magnet 812 provide a space for the second magnet 811 to move in, in which the force on the second magnet 811 is almost constant over a range of positions of the second magnet 811 intermediate between the first and third magnets 810 and 812. Therefore this arrangement provides a quasi-uniform restoring force on the second magnet 811, and therefore on the left-hand side of the mirror frame 805.

On the opposite (right-hand) side of the mirror frame 805, the fourth, fifth, and sixth magnets 824, 825, and 826, are arranged symmetrically to the magnets 810, 811, 812 on the left-hand side of the mirror frame 805, respectively, so that the right-hand side of the mirror frame 805 floats because of the attraction of the fifth magnet 825 to the fourth magnet 824 and the repulsion between the fifth magnet 825 and the sixth magnet 826. The fifth magnet 825 is embedded in the mirror frame 805 on the opposite side to the second magnet 811.

The quasi-uniform restoring force of this arrangement improves the reproducibility of the piezoelectric positioning of the mirror frame 805 (described in detail below) by maintaining a more constant force balance requirement from the piezoelectric actuators and increases their effective operating range given their limited ability to supply an opposing force for mirror frame positioning.

The mirror frame 805 therefore experiences a magnetic restoring force from both the left-hand and the right-hand sides, pushing it upwards, normal to the mirror surface, against the pin 808.

Two adjustable piezoelectric actuators 880, 890 are provided, one on each side the objective 800, each having a rod 814, 828, which can be extended or retracted. Each of the actuators 880, 890 is a linear machine and may comprise, for example, a body 813, 827; a rod 814, 828; a transducer 829,

830; and a holder 831, 832. The body 813, 827 is inert and does not move, but supports the rest of the system. The rod 814, 828 moves with the transducer 829, 830 at the end of the rod attached to the rod. The transducer 829, 830 is a piezoelectric drive that sends vibrations down the respective rod 814, 828. A copper or brass holder 831, 832 holds the respective rod 814, 828 in such a way that, when vibrated by the attached transducer, the rod moves along the body 813, 827. The transducer 829, 830 contains wires (not shown) that power the piezoelectric oscillator inside it. By varying the oscillations of the transducers 829, 830, the rods 814, 828 can be made to go down or up. This provides force on the mirror frame 805 and moves it, thereby changing the angle of the mirror 124, moving the laser beam path 535 and the opposed indicator (e.g., RED-i®) beam path 335.

The rods 814, 828 are constructed and arranged to press downward on the corner seating planes 820, 821 on the top surface of the mirror frame 805. These rods 814, 828 may vary in composition and/or size, but in the present embodiment are carbon fiber composites with dimensions of approximately 1.2 cm in length and approximately 1 mm in diameter, all providing forces exerting downward pressure on the mirror frame 805 approximately normal to its plane, against which the restoring magnets 810, 811, 812 on the left and the symmetrical magnets 824, 825, 826 on the right provide an upwards restoring force. By varying the vertical position of these rods 814, 828 piezoelectrically, the user can move the mirror frame 805 into the plane desired, and thereby arrange to scan the target with the laser beam reflected from the dichroic mirror 124.

Figure 12:
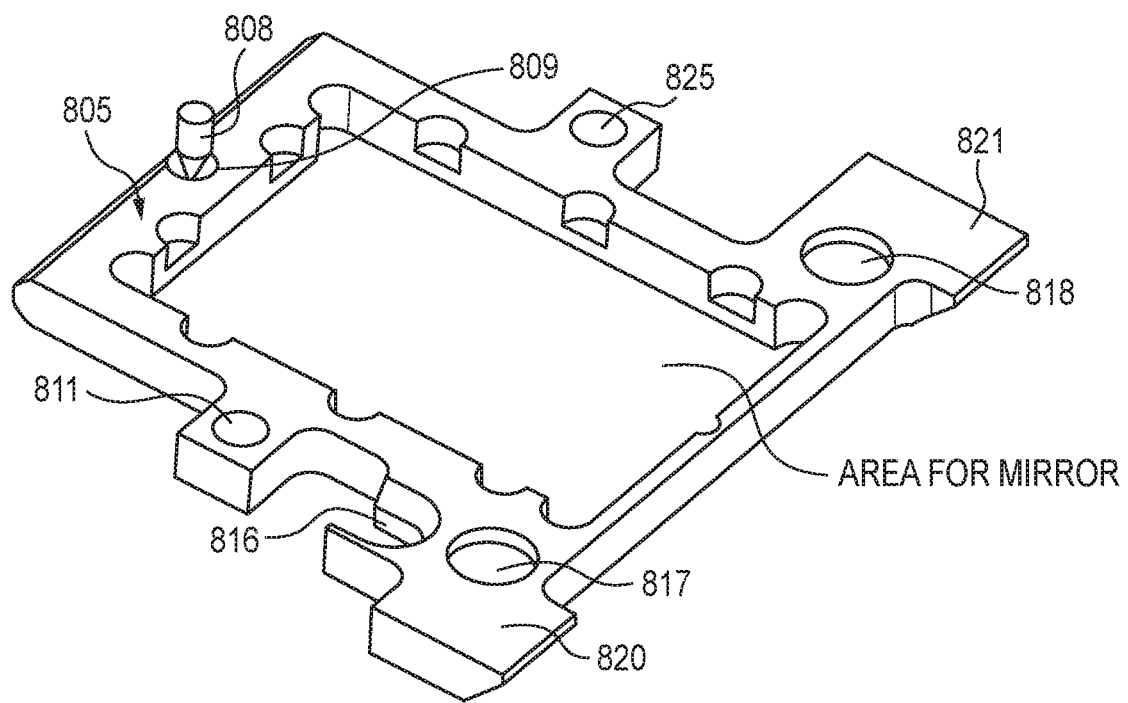
FIG. 12 is a perspective view of the mirror frame of FIG. 8.

In some embodiments, a short rod 815 (e.g., carbon, brass or aluminum) is attached at one end to the objective body (see FIG. 8) and fits into a specially-shaped slot 816 on the left-hand side of the mirror frame 805 (see FIG. 12). It is designed to prevent yaw in the mirror frame 805, which slides freely past it in the direction normal to the mirror frame 805, but is constrained against lateral (yaw) motion.

In other embodiments, different mechanisms may be used to prevent yaw (sideways motion of the mirror frame 805; i.e., movement in the plane of the mirror frame 805).

Figure 13:
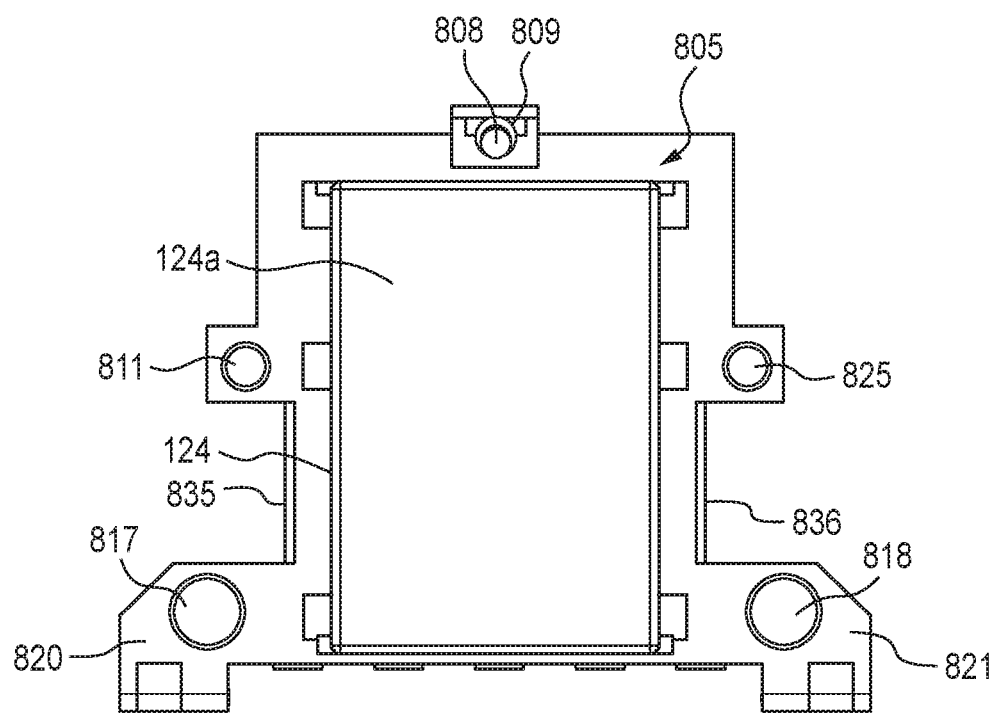
FIG. 13 is a top view of the mirror frame of FIGS. 9A and 9C.
Figure 14:
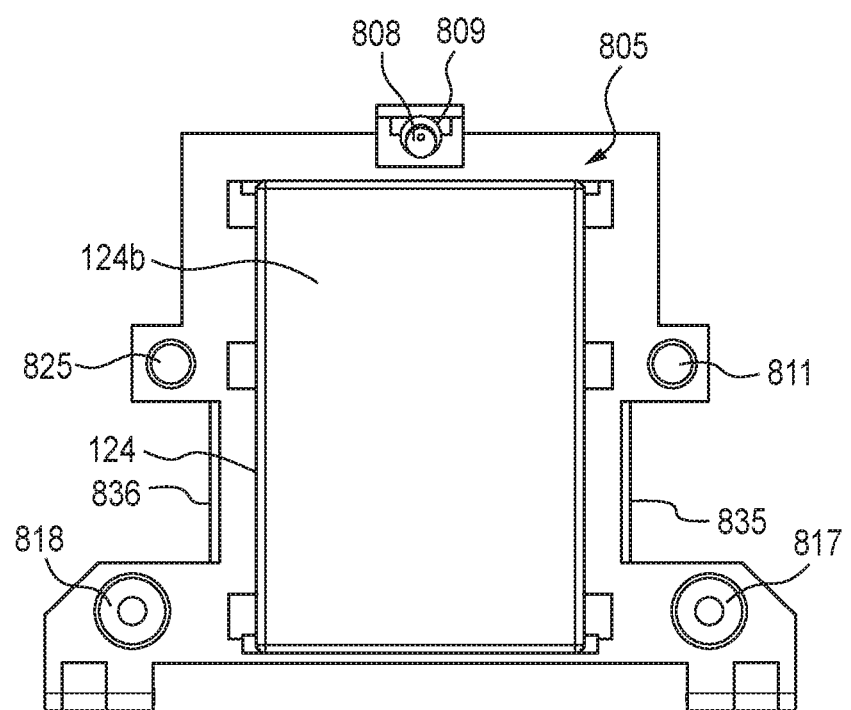
FIG. 14 is a bottom view of the mirror frame of FIG. 13.

For example, with reference to FIGS. 9A, 9C, and 13, in some embodiments, the constraint against yaw motion is provided by mounting a thin carbon fiber 833, 834 (e.g., about 0.5 mm in diameter) on each side of the objective body, each fiber attached to the objective body using adhesive or a screw retainer, and directed across the respective transverse slot 835, 836. This carbon fiber 833, 834 provides a barrier against which the mirror frame 805 slides up and down as the laser beam direction 535 is changed. The function of the carbon fiber 833, 834 is to prevent the mirror frame 805 moving along the slot axis in the direction normal to the optic axis (yaw motion). The carbon fiber 833, 834 can, for example, be attached by glue drops (shown as two circles in FIGS. 9A and 9C). The carbon fibers (or the alternative steel rods described below) have elastic properties that are useful to provide a force so that the mirror frame 805 is kept in its central position and does not yaw, and/or to allow some shock absorption if the moveable-beam laser objective 800 is suddenly accelerated (e.g., struck or dropped).

In further embodiments, two carbon fibers can be provided on each side of the mirror frame 805, covering both open ends of each slot 835, 836. The first fiber can be mounted at one end of the slot and the second fiber can be mounted at the opposite end of the slot, constraining the mirror frame from moving in the opposite direction parallel to the slot axis normal to the optic axis. The two fibers can be symmetrically placed on either end of the respective transverse slot 835, 836, keeping the mirror frame 805 within the slot 835, 836 but free to move towards one side or the other of the slot, thereby changing the angle of the mirror 124 held in the mirror frame 805 and changing the direction of the light reflected from it.

In the embodiments above, (stainless) steel rods may be used in place of the carbon fibers to prevent yaw. In some embodiments, stainless steel rods having a diameter of about 1 mm may be used in place of the carbon fibers described above.

In some embodiments, an additional slot or small trench may be built into the foot of the mirror frame 805 on each side, into which the end of the actuator rod 814, 828 fits. The additional slot/trench in the mirror frame 805 prevents sideways motion (yaw) since the mirror frame 805 cannot move the rod 814, 828 out of the trench, which therefore prevents yaw.

Control of the mirror frame 805 is provided by the two small linear piezoelectric actuators 880, 890, attached to the objective body, which generate force against the mirror frame 805 in a direction opposite to the restoring force and which form two of the three-point kinematic supports (the third being the pin 808) that set the angular position of the beam mirror 124. The distance moved by the actuator rods 814, 828, forward or backward, is determined by a voltage pulse format and pulse length under computer control. These actuators 880, 890 therefore provide the freedom to move the IR laser and its RED-i® indicator across the entire target field.

In some embodiments, the orientation of the mirror frame 805 is derived in two ways, as described below.

1. Magnetic Location

Mirror frame 805 orientation may be determined by using two further magnets 817, 818 mounted on the mirror frame 805 preferably centered on the corner rod seats 820, 821 (on which the piezoelectric actuator rods 814, 828 press), or on the line between the corner rod seats 820, 821 and the suspension pin socket 809. Directly beneath these magnets 817, 818 two symmetrically placed Hall Effect sensors 819, 837 are mounted on the objective body. As the mirror frame 805 moves on its two axes, the fields at the two Hall sensors 819, 837 give a measure of the mirror frame 805 orientation. The Hall sensors 819, 837, the outputs of which may be provided to the control computer, provide a rapid determination of distance from mirror frame Hall magnet 817 to Hall sensor 819 on the left-hand side, and analogously Hall magnet 818 to Hall sensor 837 on the right-hand side, and enable quick computation of mirror frame 805 orientation, and how to reach the designated destination.

2. RED-i® Finder Location

Mirror frame 805 orientation can also be determined by the position of the red finder LED dot on the image of the target. Dot position can be located by identification of the (usually red) dot and deriving its centroid coordinates by image analysis. Mirror frame 805 orientation can be rapidly obtained from those coordinates.

In some embodiments, the piezoelectric linear actuators 880, 890 are placed directly above the centers of position-measuring magnets 817, 818 respectively, or directly on the axis between the cup 809 and the piezoelectric actuator rod 814, 828 tip pressing on the mirror frame 805 at corners 820, 821.

The moveable-beam objective combines piezoelectric linear actuators 880, 890 to position the mirror frame 805, and Hall sensors 819, 837 to determine its angular orientation. In general the piezoelectric actuator's positional response to control pulses will vary depending on the individual actuator and on the force it is required to apply to achieve the desired mirror frame 805 position. In some embodiments, pulses provided to an actuator motor in a duty cycle, for example, of ¾ on, ¼ off may provide an upward/backward movement, while the opposite (¼ off, ¾ on) may provide a downward/forward movement. The length of the pulse determines how far the rods 814, 828 move. The Hall sensors 819, 837 may also respond slightly differently to the local field strength of the positioning magnets 810, 811, 812 and 824, 825, 826 on the mirror frame 805. For each 2D position of the mirror frame 805 (and thus position of the laser focus on the target) there will be a corresponding 2D response from the Hall sensors 819, 837. A feedback loop programmed in the control computer can be used to control the piezoelectric actuators 880, 890 to reach a specific 2D position as determined by the Hall sensors 819, 837. A calibration may be performed by the control computer to map the 2D angular position of the mirror frame 805 (as determined directly by image analysis of the RED-i® spot on a camera) to the corresponding 2D coordinates measured by the Hall sensors 819, 837 to be used as inputs to the actuator feedback loop.

Calibration is preferably automated and provided by control computer software analysis of the positional record. The orientation of the mirror frame 805 is put through N positions (where N is determined by measurement; e.g., 10<N<2000). In each position the two Hall Effect signals and the two coordinates of the single RED-i® finder dot are determined and stored.

The relationship between the Hall values and the RED-i® position is derived and a predictive model generated. Preferably, this occurs at set intervals to ensure that calibration has not changed. In some embodiments, the automated calibration may take place every morning before use. In other embodiments it may occur dynamically in real time when the laser is used.

In some embodiments, Hall sensors 819, 837 can be used to provide a magnetic map of the field of view, where the magnetic field at each of the Hall sensors 819, 837 is known for all positions (x,y) of the RED-i® indicator beam, and a predictive correlation of required magnetic field on Hall sensors 819, 837 can be derived for any given (x,y) position. In some embodiments, a program code is provided, which automatically runs an algorithm to generate the magnetic map, by determining the position of the RED-i® dot on the screen and correlating it with the magnetic field measurements directly. This algorithm can be performed at an initial time or at any time required. The control computer may thus be configured to measure a position of the indicator beam in Cartesian coordinates; to measure signals from the Hall sensors while the indicator beam is at the measured position; and to correlate the coordinates with the signals for a plurality of indicator beam positions, thereby generating a magnetic map of the field of view.

In some embodiments, one or more artificial intelligence (AI) modules and/or one or more optimization algorithms may be used to learn and predict the location of the laser beam on the target.

Figure 15:
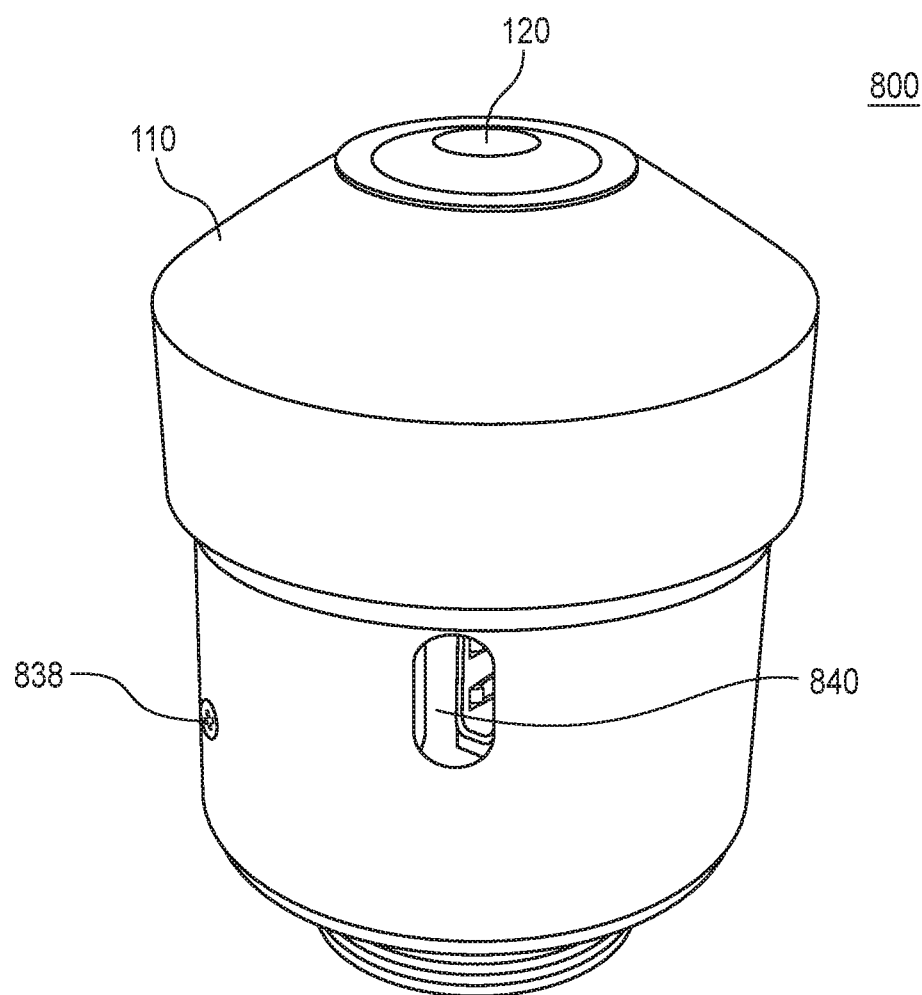
FIG. 15 is a perspective view of a moveable-beam laser objective assembly according to some embodiments of the invention.
Figure 16:
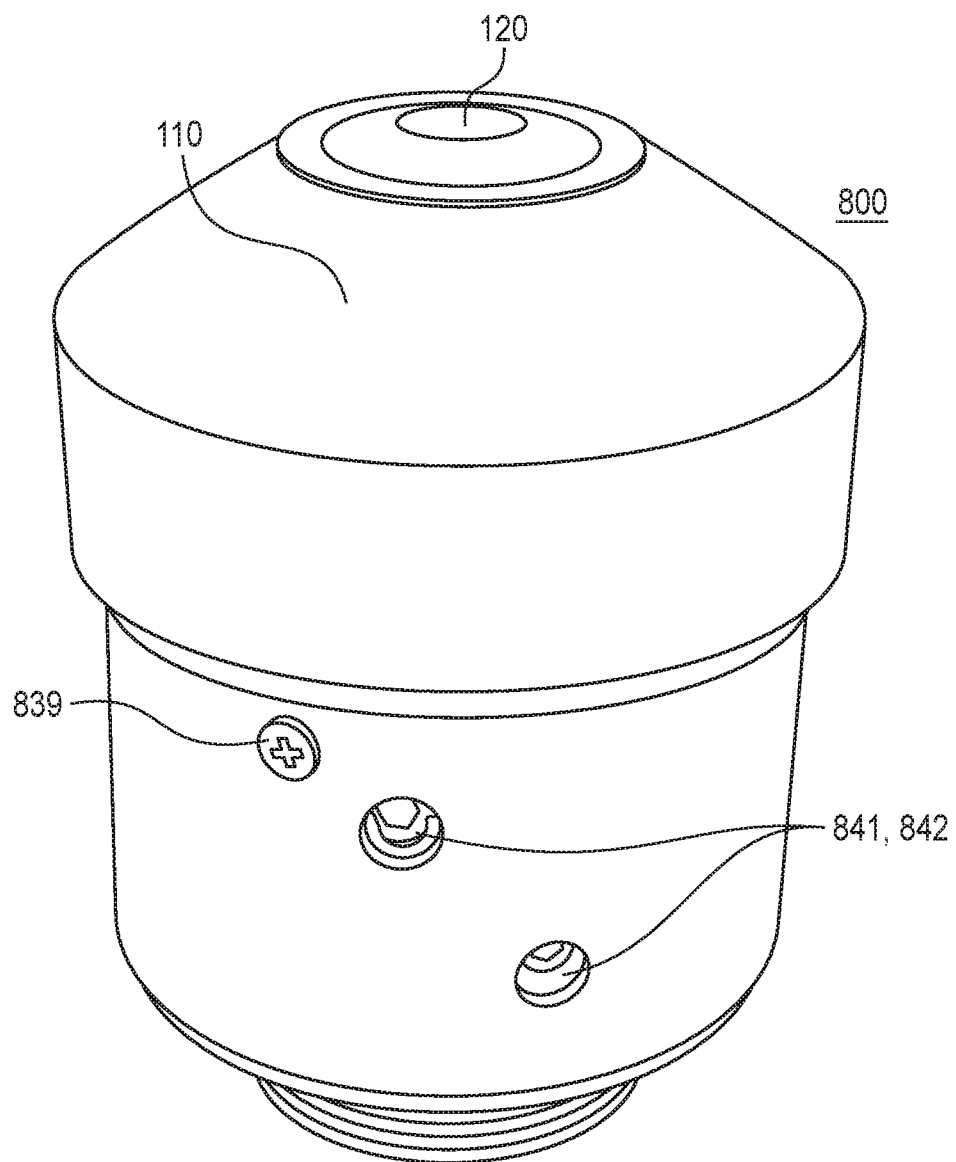
FIG. 16 is another perspective view of the moveable-beam objective of FIG. 15.

FIGS. 15-21 show a moveable-beam laser objective assembly 800 according to certain illustrative embodiments of the invention. FIGS. 15 and 16 show a perspective view a moveable-beam objective 800 within the objective housing 110. Objective 120 is at the upper end of the assembly, in the orientation shown in FIGS. 15-21. Holding screws 838, 839 may be provided (e.g., on opposite sides) for securing the cover 110 over the assembly 800. An input connector 840 may be provided (e.g., micro HDMI). Apertures 841, 842 are provided for indicator (e.g., RED-i®) mirror 330 adjustment screws 851, 852 (see FIG. 19).

Figure 17:
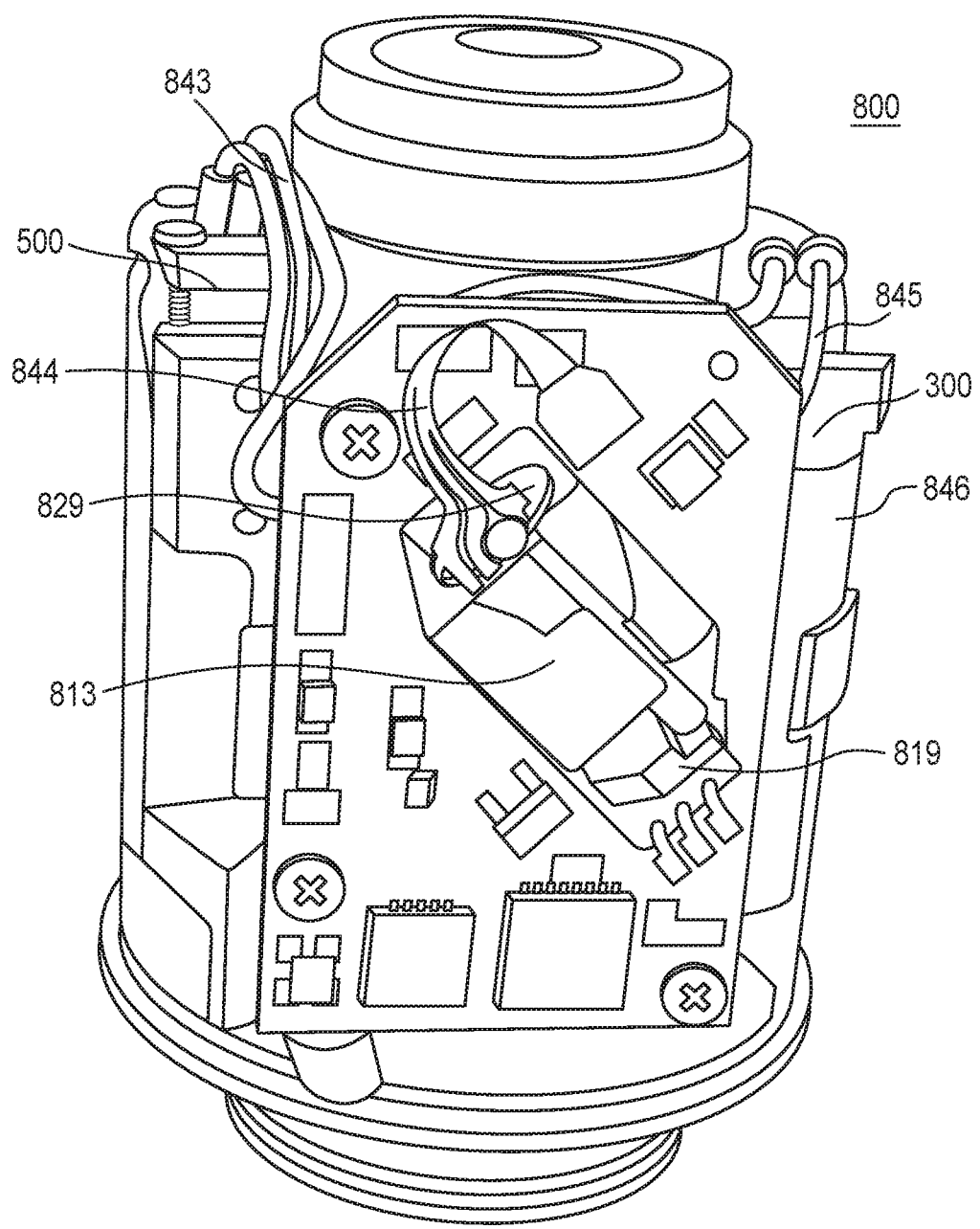
FIG. 17 is a perspective view of the left-hand side of the moveable-beam objective of FIG. 15, shown without the housing.

FIG. 17 shows the left-hand side of the moveable-beam objective of FIG. 16, with housing 110 removed. Laser assembly/module 500 is at the left in this view (along with laser cables 843), and indicator assembly/module 300 is at the right (along with RED-i® cables 845). A flexible control board 846 is wrapped around three sides of the objective 800 (e.g., covering some of the features shown in the diagram of FIG. 9A). The piezo head 829, body 813, and cable 844 of linear actuator 880 are shown, as is Hall detector 819.

Figure 18:
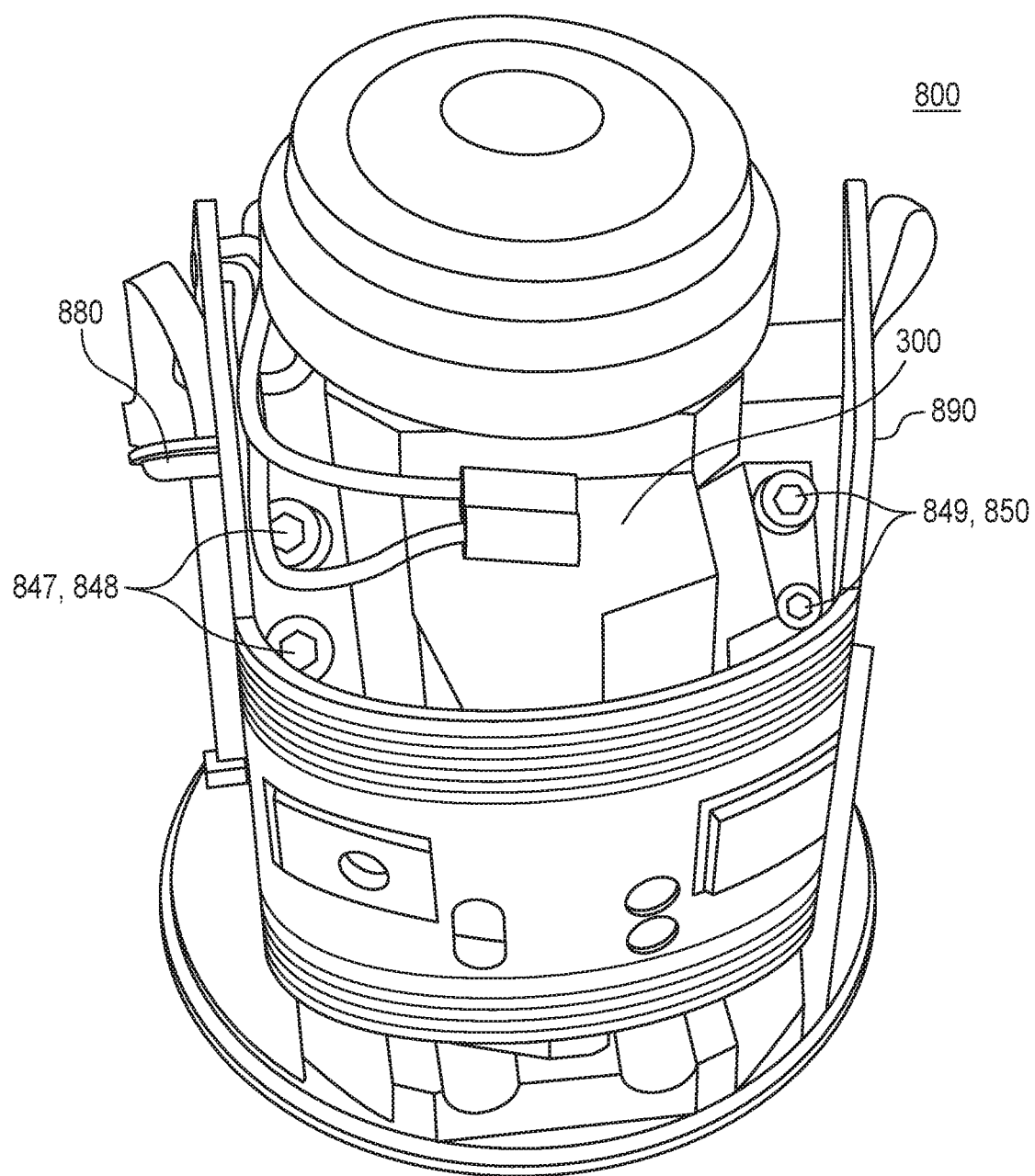
FIG. 18 is a front perspective view of the moveable-beam objective of FIG. 17, showing the objective end thereof.
Figure 19:
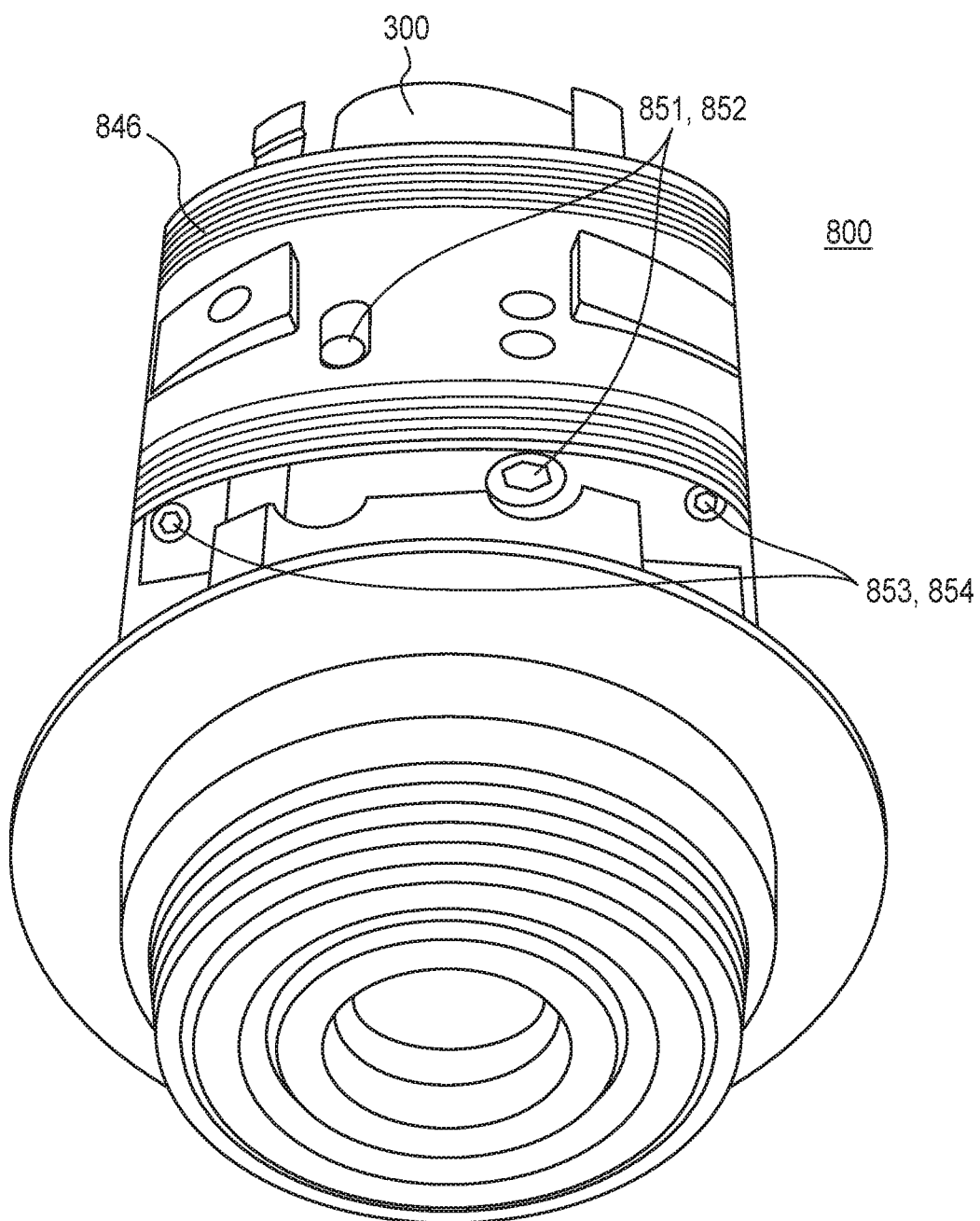
FIG. 19 is a front perspective view of the moveable-beam objective of FIG. 17, showing the camera-facing end thereof.

FIG. 18 is a front perspective view of the moveable-beam objective of FIG. 17, showing the objective end thereof. Indicator module 300 is at the front in this view; actuator 880 and corresponding holding screws 847, 848 are at the left; and actuator 890 and corresponding holding screws 849, 850 are at the left. FIG. 19 is also a front perspective view of the moveable-beam objective of FIG. 17, showing the camera-facing end thereof. As indicated in FIG. 19, flexible control board 846 is wrapped around this front side as well (over RED-i® "bullet" 300), and indicator mirror 330 adjustment screws 851, 852 are visible, along with support screws 853, 854 for Hall sensors 819, 837, respectively.

Figure 20:
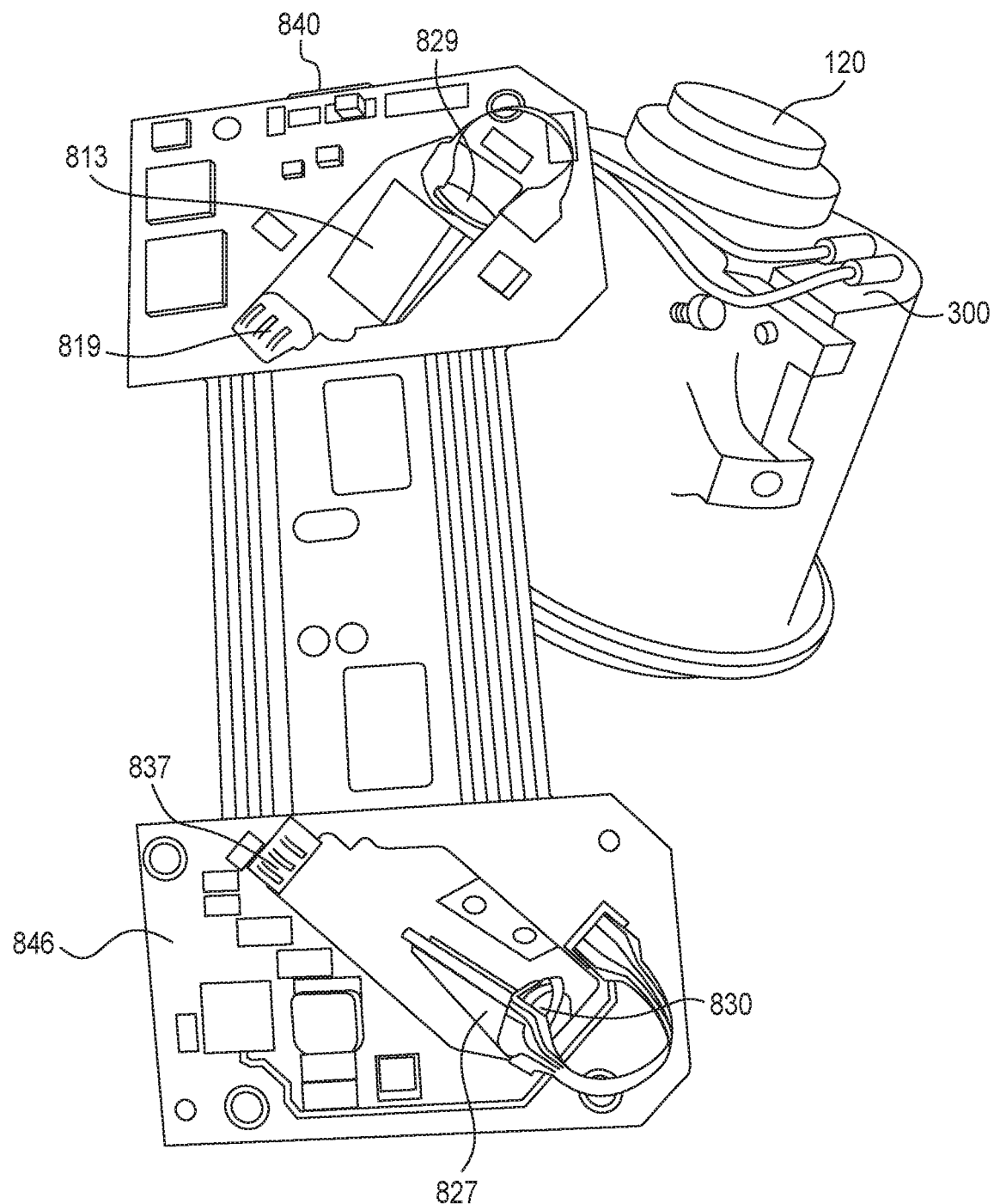
FIG. 20 is a perspective view of the left-hand side of the moveable-beam objective of FIG. 17, showing the control board detached from the objective body.

FIG. 20 is a perspective view of the left-hand side of the moveable-beam objective of FIG. 17, showing the control board 846 detached from the objective body. On the left-hand side of the control board 846 (at top in the view of FIG. 20), Hall sensor 819 is visible, along with actuator head 829 and body 813, and connector 840. On the right-hand side of the control board 846 (at bottom in the view of FIG. 20), Hall sensor 837 is visible, along with actuator head 830 and body 827.

Figure 21:
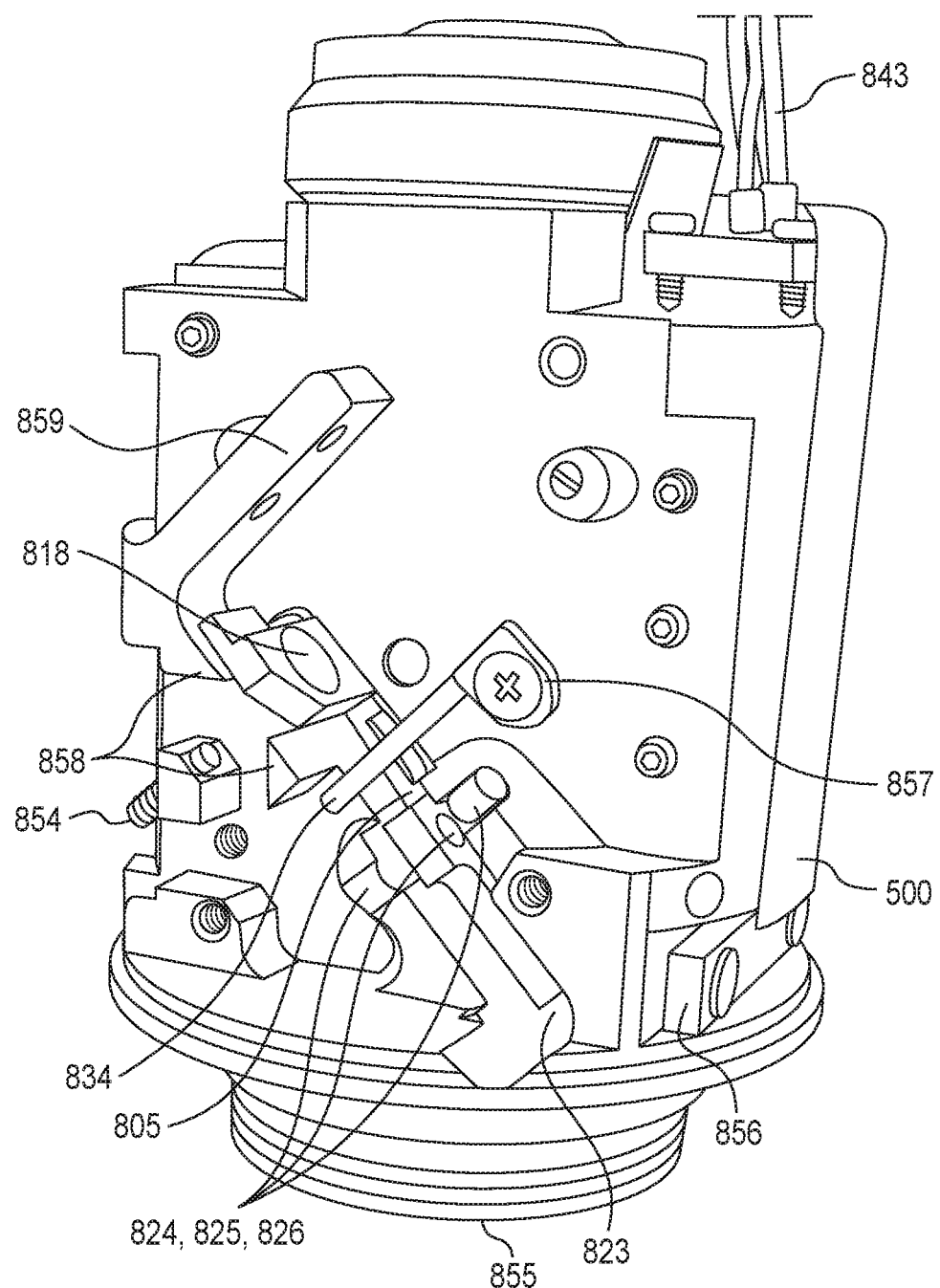
FIG. 21 is a perspective view of the right-hand side of the moveable-beam objective of FIG. 15, shown without the housing and without the control board.
Figure 22:
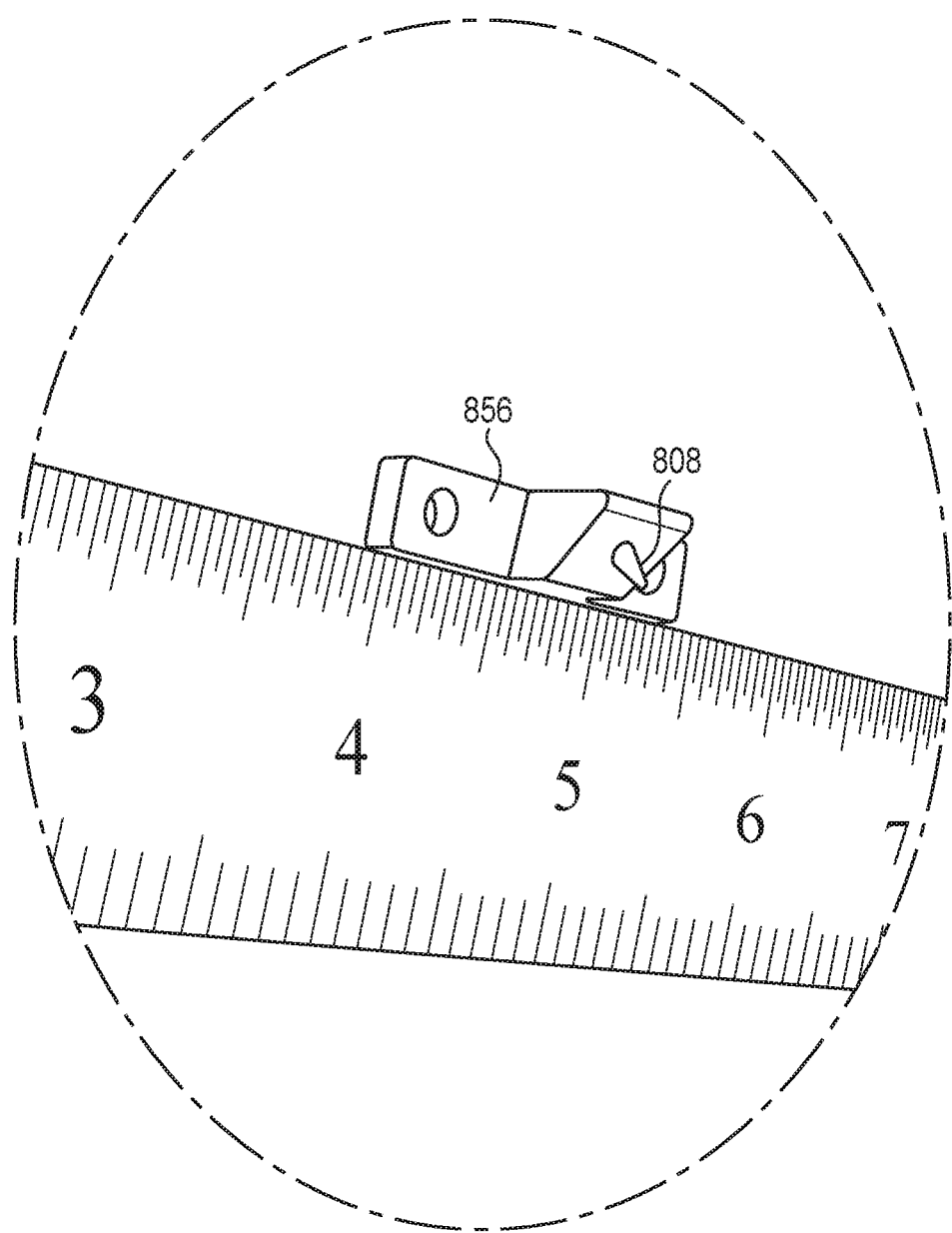
FIG. 22 is a perspective view of a pin and pin holder, according to some embodiments of the invention.

FIG. 21 shows the right-hand side of the moveable-beam objective of FIG. 15, with the housing 110 and the control board 846 removed. Laser module 500 is at the right in this view along with laser cables 843. Mirror frame 805 is shown in slot 823, with Hall magnet 818 and restoring force magnets 824, 825, 826. A holder 857 is shown for anti-yaw rod 834. Hall inset screw 854, Hall support 858, and actuator support 859, are provided on the objective body on the both the left-hand and the right-hand sides. An RMS thread 855 is provided on the camera-facing end of the objective (e.g., as part of turret mount 130). A pin holder 856 is provided, which can hold a pin 808 (fixed thereto or formed together as a single part). FIG. 22 is a perspective view of a pin 808 and pin holder 856, according to some embodiments of the invention.

Figure 23:
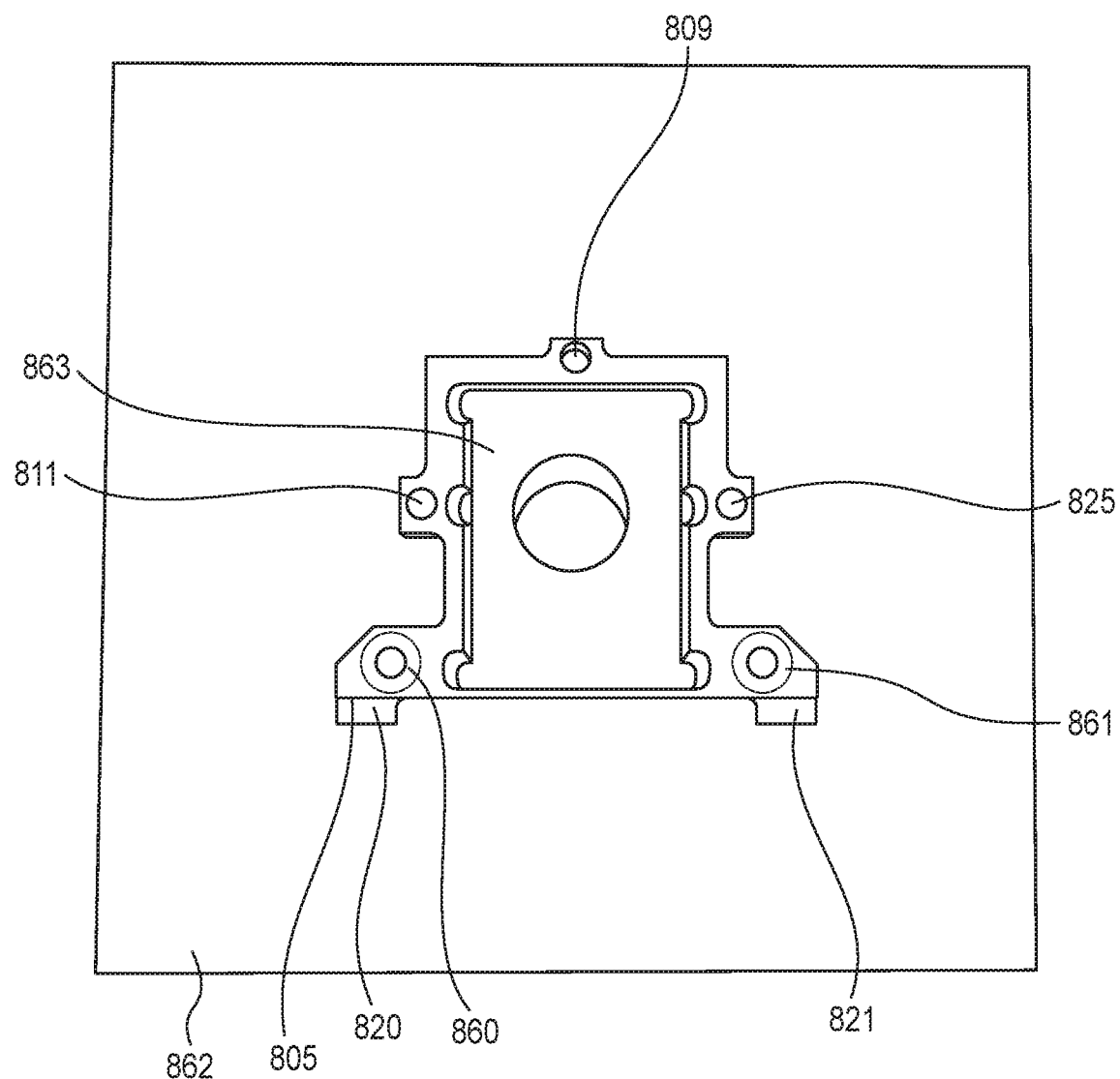
FIG. 23 is a top view of a mirror frame according to some embodiments of the invention.

FIG. 23 is a top view of a moveable mirror frame 805 according to some embodiments of the invention, resting on a mirror frame loading fixture 862. Intermediate magnets 811, 825 are mounted on either side of the frame 805, and a sapphire socket 809 is provided at the upper center. In the lower corners, Hall sockets 860, 861 are provided for magnets 817, 818 (not shown) and ledges 820, 821 are provided as touchpoints for linear actuators 880, 890 (not shown). Dichroic socket 863 is provided in the center of the frame 805 to accommodate dichroic mirror 124 (not shown).

While there have been shown and described fundamental novel features of the invention as applied to the preferred and exemplary embodiments thereof, it will be understood that omissions and substitutions and changes in the form and details of the disclosed invention may be made by those skilled in the art without departing from the spirit of the invention. Moreover, as is readily apparent, numerous modifications and changes may readily occur to those skilled in the art. For example, any feature(s) in one or more embodiments may be applicable and combined with one or more other embodiments. Hence, it is not desired to limit the invention to the exact construction and operation shown and described and, accordingly, all suitable modification equivalents may be resorted to falling within the scope of the invention as claimed. It is the intention, therefore, to be limited only as indicated by the scope of the claims appended hereto.

What is claimed is:

1. A moveable-beam laser objective assembly for mounting onto a turret of a microscope having a camera, comprising:
a modular objective body including an objective having an optical axis;
a dichroic mirror located within the objective body and positioned at an angle relative to the optical axis, the mirror configured to direct a laser beam through the objective and toward a target for performing laser microsurgery and configured to direct an indicator beam toward the camera, in a direction opposite to that of the laser beam, for providing a visible indication of the laser beam position on the target; and
a moveable mirror frame configured to move the mirror and thereby move the laser beam across the target, the mirror frame comprising a dichroic socket in the center of the frame, configured to surround the mirror on four sides; a suspension pin socket at an upper center portion of the frame; two restoring magnets mounted on either side of the frame; and two position-measuring magnets mounted in Hall sockets on the lower corners of the frame.

2. The objective assembly of claim 1, further comprising two linear piezoelectric actuators positioned within the objective body and configured to set an angular position of the mirror, each actuator having a rod configured to be extended or retracted to provide force on the mirror frame substantially perpendicular to its plane.

3. The objective assembly of claim 2, wherein each actuator rod is configured to move responsive to oscillations of a piezoelectric transducer attached to an end thereof.

4. The objective assembly of claim 2, further comprising a pin, wherein the pin and the two actuator rods form a three-point support of the mirror frame.

5. The objective assembly of claim 2, wherein the distance moved by the actuator rods is determined by a voltage pulse format and pulse length under computer control.

6. The objective assembly of claim 1, further comprising one or more springs positioned between the mirror frame and the objective body.

7. The objective assembly of claim 1, the mirror having a first side for directing the laser beam and a second side for directing the indicator beam.

8. The objective assembly of claim 1, wherein a first side surface of the mirror facing the objective lens has a reflective coating thereon.

9. The objective assembly of claim 8, wherein the coating on the first side surface of the mirror is configured to enhance reflectivity in an infrared wavelength of the laser beam, and transmit in the visible and ultraviolet.

10. The objective assembly of claim 8, wherein a second side surface of the mirror facing the camera is uncoated or coated with an anti-reflector coating, and the indicator beam is transmitted therethrough and reflected by the underside of the coating on the first side surface of the mirror.

11. The objective assembly of claim 10, wherein the coating on the first side surface of the mirror is configured to preferentially simultaneously reflect both the laser beam wavelength and the indicator beam wavelength.

12. The objective assembly of claim 8, wherein a second side surface of the mirror facing the camera includes a reflector coating or other reflection enhancing mechanism, and the indicator beam is reflected by the second side surface of the mirror.

13. The objective assembly of claim 1, further comprising at least one rod or fiber secured to the objective body, the rod or fiber constructed and arranged to constrain the mirror frame against yaw motion.

14. The objective assembly of claim 1, wherein each restoring magnet is a second intermediate magnet positioned between a first magnet mounted in the objective body and configured to attract the second magnet, and a third magnet mounted substantially coaxial with the first magnet and the second magnet and configured to repel the first magnet and the second magnet.

15. The objective assembly of claim 1, further comprising two Hall effect sensors positioned proximal to the two position-measuring magnets.

16. The objective assembly of claim 15, wherein the two Hall effect sensors provide a magnetic map of the field of view, where the magnetic field at each of the Hall sensors is known for a plurality of positions (x,y) of the indicator beam.

17. The objective assembly of claim 1, wherein the mirror frame further comprises at least one slot or trench configured to accommodate a rod or fiber to prevent yaw.

* * * * *